United States Patent
Stump et al.

(10) Patent No.: US 12,449,793 B2
(45) Date of Patent: Oct. 21, 2025

(54) COLLABORATION TOOLS

(71) Applicant: Rockwell Automation Technologies, Inc., Mayfield Heights, OH (US)

(72) Inventors: Andrew R Stump, Mentor, OH (US); Anthony Carrara, Strongsville, OH (US); Eashwer Srinivasan, Fremont, CA (US); Christopher W Como, Chagrin Falls, OH (US); Sharon M Billi-Duran, Euclid, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

(21) Appl. No.: 18/332,127

(22) Filed: Jun. 9, 2023

(65) Prior Publication Data
US 2023/0324894 A1    Oct. 12, 2023

Related U.S. Application Data

(63) Continuation of application No. 16/584,415, filed on Sep. 26, 2019, now Pat. No. 11,733,687.

(51) Int. Cl.
| | | |
|---|---|---|
| G05B 19/418 | (2006.01) | |
| G05B 19/4093 | (2006.01) | |
| G06T 19/00 | (2011.01) | |

(52) U.S. Cl.
CPC . *G05B 19/41885* (2013.01); *G05B 19/40937* (2013.01); *G05B 19/41835* (2013.01); *G06T 19/006* (2013.01)

(58) Field of Classification Search
None
See application file for complete search history.

(56) References Cited

U.S. PATENT DOCUMENTS

| | | |
|---|---|---|
| 5,526,522 A | 6/1996 | Takeuchi |
| 6,516,451 B1 | 2/2003 | Patin |
| (Continued) | | |

FOREIGN PATENT DOCUMENTS

| | | |
|---|---|---|
| CN | 101009018 A | 8/2007 |
| CN | 101201599 A | 6/2008 |
| (Continued) | | |

OTHER PUBLICATIONS

Kao, Yung-Chou, and Grier CI Lin. "Development of a collaborative CAD/CAM system." Robotics and Computer-Integrated Manufacturing 14.1 (1998): 55-68. (Year: 1998).*

(Continued)

*Primary Examiner* — Carlos R Ortiz Rodriguez
(74) *Attorney, Agent, or Firm* — Amin, Turocy & Watson, LLP

(57) ABSTRACT

An industrial integrated development environment (IDE) supports collaborative tools that allow multiple designers and programmers to remotely submit design input to the same automation system project in parallel while maintaining project consistency. These collaborative features can include, for example, brokering between different sets of design input directed to the same portion of the system project, generating notifications to remote designers when a portion of the system project is modified, sharing of development interfaces or environments, facilitating involvement of outside technical support experts to assist with design issues, and other collaborative features.

20 Claims, 21 Drawing Sheets

(56) References Cited

U.S. PATENT DOCUMENTS

| | | |
|---|---|---|
| 6,993,745 B1 | 1/2006 | Ballantyne et al. |
| 7,313,609 B1 | 12/2007 | Wischinski |
| 7,324,856 B1 | 1/2008 | Bromley |
| 7,839,416 B2 | 11/2010 | Ebensberger et al. |
| 7,882,495 B2 | 2/2011 | Tillmann et al. |
| 8,667,456 B1 | 3/2014 | Czymontek |
| 8,812,684 B1 | 8/2014 | Hood et al. |
| 9,223,567 B2 | 12/2015 | DeLuca et al. |
| 10,372,107 B2 | 8/2019 | Majewski et al. |
| 10,388,075 B2 | 8/2019 | Schmirler et al. |
| 10,402,216 B1 | 9/2019 | Bell et al. |
| 10,503,632 B1 | 12/2019 | Sivanantham et al. |
| 10,559,043 B1 | 2/2020 | Schlintl |
| 10,606,576 B1 | 3/2020 | Tung et al. |
| 10,761,810 B2 | 9/2020 | Ramakrishna et al. |
| 10,832,187 B2 | 11/2020 | Sharma et al. |
| 10,936,807 B1 | 3/2021 | Walters et al. |
| 11,048,500 B2 | 6/2021 | Grant et al. |
| 11,087,053 B1 | 8/2021 | Sha et al. |
| 11,107,236 B2 | 8/2021 | Hansson |
| 2002/0004804 A1 | 1/2002 | Muenzel |
| 2002/0040304 A1 | 4/2002 | Shenoy et al. |
| 2002/0161895 A1 | 10/2002 | Appiah et al. |
| 2002/0191023 A1 | 12/2002 | Chandhoke et al. |
| 2003/0009250 A1 | 1/2003 | Resnick et al. |
| 2003/0028364 A1 | 2/2003 | Chan et al. |
| 2003/0045950 A1 | 3/2003 | Bronikowski et al. |
| 2004/0073404 A1 | 4/2004 | Brooks et al. |
| 2004/0088688 A1 | 5/2004 | Hejlsberg et al. |
| 2004/0153992 A1 | 8/2004 | Molina-Moreno et al. |
| 2005/0257203 A1 | 11/2005 | Nattinger |
| 2005/0268288 A1 | 12/2005 | Nattinger |
| 2006/0041440 A1 | 2/2006 | Cheng et al. |
| 2006/0224534 A1 | 10/2006 | Hartman et al. |
| 2007/0016309 A1 | 1/2007 | Mckelvey et al. |
| 2007/0073750 A1 | 3/2007 | Chand et al. |
| 2007/0209038 A1 | 9/2007 | Fuchs et al. |
| 2007/0282766 A1 | 12/2007 | Hartman et al. |
| 2008/0022259 A1 | 1/2008 | Macklem et al. |
| 2008/0082185 A1 | 4/2008 | Hood et al. |
| 2008/0082186 A1 | 4/2008 | Hood et al. |
| 2008/0092131 A1 | 4/2008 | Mcintyre et al. |
| 2008/0163344 A1 | 7/2008 | Yang |
| 2008/0235166 A1 | 9/2008 | Sayyar-Rodsari et al. |
| 2008/0288931 A1 | 11/2008 | Kohli |
| 2009/0064103 A1 | 3/2009 | Shih |
| 2009/0083649 A1 | 3/2009 | Baier et al. |
| 2009/0088875 A1 | 4/2009 | Baier et al. |
| 2009/0089225 A1 | 4/2009 | Baier et al. |
| 2009/0089231 A1 | 4/2009 | Baier et al. |
| 2009/0089234 A1 | 4/2009 | Sturrock et al. |
| 2009/0089671 A1 | 4/2009 | Bliss et al. |
| 2009/0276752 A1 | 11/2009 | Sharma |
| 2010/0031234 A1 | 2/2010 | Chaar et al. |
| 2010/0082133 A1 | 4/2010 | Chouinard et al. |
| 2010/0083220 A1 | 4/2010 | Chouinard et al. |
| 2010/0083223 A1 | 4/2010 | Chouinard et al. |
| 2010/0241891 A1 | 9/2010 | Beasley |
| 2010/0250497 A1 | 9/2010 | Redlich et al. |
| 2010/0269094 A1 | 10/2010 | Levenshteyn et al. |
| 2010/0293481 A1 | 11/2010 | Austin |
| 2011/0239198 A1 | 9/2011 | Sweis |
| 2012/0109590 A1 | 5/2012 | Trainer et al. |
| 2012/0212484 A1 | 8/2012 | Haddick et al. |
| 2013/0007693 A1 | 1/2013 | Bliss et al. |
| 2013/0123946 A1 | 5/2013 | Govindaraj et al. |
| 2013/0131840 A1 | 5/2013 | Govindaraj et al. |
| 2013/0212214 A1 | 8/2013 | Lawson et al. |
| 2013/0218867 A1 | 8/2013 | DeLuca et al. |
| 2013/0332212 A1 | 12/2013 | Cohen |
| 2014/0013313 A1 | 1/2014 | Eker et al. |
| 2014/0047413 A1 | 2/2014 | Sheive et al. |
| 2014/0096108 A1 | 4/2014 | Austin |
| 2014/0130020 A1 | 5/2014 | Boshernitsan et al. |
| 2014/0222383 A1 | 8/2014 | Eitzman et al. |
| 2014/0229389 A1 | 8/2014 | Pantaleano et al. |
| 2014/0278327 A1 | 9/2014 | Hauenstein |
| 2014/0336791 A1 | 11/2014 | Asenjo et al. |
| 2014/0337277 A1 | 11/2014 | Asenjo et al. |
| 2014/0359586 A1 | 12/2014 | Payette et al. |
| 2015/0180734 A1 | 6/2015 | Maes et al. |
| 2015/0186119 A1 | 7/2015 | Chouinard et al. |
| 2015/0248845 A1 | 9/2015 | Postlethwaite et al. |
| 2015/0276208 A1 | 10/2015 | Maturana et al. |
| 2016/0132595 A1 | 5/2016 | Bliss et al. |
| 2016/0140930 A1 | 5/2016 | Pusch et al. |
| 2016/0179993 A1 | 6/2016 | Maturana et al. |
| 2016/0274552 A1 | 9/2016 | Strohmenger et al. |
| 2016/0274558 A1 | 9/2016 | Strohmenger et al. |
| 2016/0282853 A1 | 9/2016 | Michalscheck et al. |
| 2016/0284128 A1 | 9/2016 | Michalscheck et al. |
| 2016/0291566 A1 | 10/2016 | Prosak et al. |
| 2016/0330082 A1 | 11/2016 | Bliss et al. |
| 2016/0364675 A1 | 12/2016 | Sharma et al. |
| 2017/0097822 A1* | 4/2017 | DeLuca ............... G06F 8/71 |
| 2017/0103470 A1 | 4/2017 | Xing et al. |
| 2017/0109933 A1* | 4/2017 | Voorhees ............ G06F 11/36 |
| 2017/0206237 A1 | 7/2017 | Sokol et al. |
| 2017/0308052 A1 | 10/2017 | Kajiyama |
| 2017/0329687 A1 | 11/2017 | Chorley et al. |
| 2017/0336947 A1 | 11/2017 | Bliss et al. |
| 2017/0351226 A1 | 12/2017 | Bliss et al. |
| 2017/0357565 A1 | 12/2017 | Ledet |
| 2018/0025286 A1 | 1/2018 | Gorelik et al. |
| 2018/0039725 A1 | 2/2018 | Gonnsen et al. |
| 2018/0039905 A1 | 2/2018 | Anghel et al. |
| 2018/0052451 A1 | 2/2018 | Billi-Duran et al. |
| 2018/0083982 A1 | 3/2018 | Asenjo et al. |
| 2018/0129276 A1 | 5/2018 | Nguyen et al. |
| 2018/0130260 A1 | 5/2018 | Schmirler et al. |
| 2018/0131907 A1 | 5/2018 | Schmirler et al. |
| 2018/0136910 A1 | 5/2018 | Noetzelmann et al. |
| 2018/0169517 A1 | 6/2018 | Balest |
| 2018/0188715 A1 | 7/2018 | Cella et al. |
| 2018/0192075 A1 | 7/2018 | Chambers et al. |
| 2018/0197347 A1 | 7/2018 | Tomizuka |
| 2018/0246803 A1 | 8/2018 | Zhang |
| 2018/0267496 A1 | 9/2018 | Wang et al. |
| 2018/0299863 A1 | 10/2018 | Caine et al. |
| 2018/0307311 A1 | 10/2018 | Webb et al. |
| 2018/0342106 A1 | 11/2018 | Rosado |
| 2018/0357334 A1 | 12/2018 | Chao et al. |
| 2018/0357922 A1 | 12/2018 | Dutta et al. |
| 2018/0373885 A1 | 12/2018 | Arad et al. |
| 2019/0012151 A1 | 1/2019 | Holbrook et al. |
| 2019/0057548 A1 | 2/2019 | Singh et al. |
| 2019/0079643 A1 | 3/2019 | Kershaw et al. |
| 2019/0079740 A1 | 3/2019 | Sharma et al. |
| 2019/0129181 A1 | 5/2019 | Polcak et al. |
| 2019/0146577 A1 | 5/2019 | Rokade et al. |
| 2019/0147655 A1 | 5/2019 | Galera et al. |
| 2019/0171187 A1 | 6/2019 | Cella et al. |
| 2019/0188108 A1 | 6/2019 | Jagannathan |
| 2019/0205113 A1 | 7/2019 | Karpoff et al. |
| 2019/0220253 A1 | 7/2019 | Pradhan et al. |
| 2019/0279132 A1 | 9/2019 | Escriche et al. |
| 2019/0279424 A1 | 9/2019 | Clausen et al. |
| 2019/0325660 A1 | 10/2019 | Schmirler et al. |
| 2019/0385342 A1 | 12/2019 | Freeman et al. |
| 2020/0012265 A1 | 1/2020 | Thomsen et al. |
| 2020/0019147 A1 | 1/2020 | Ludwig et al. |
| 2020/0019493 A1 | 1/2020 | Ramakrishna et al. |
| 2020/0150638 A1 | 5/2020 | Mourzine et al. |
| 2020/0175395 A1 | 6/2020 | Kathiresan et al. |
| 2020/0285462 A1 | 9/2020 | Sabath et al. |
| 2020/0371665 A1 | 11/2020 | Clausen et al. |
| 2021/0011712 A1 | 1/2021 | Grant et al. |
| 2021/0034041 A1 | 2/2021 | Fang et al. |
| 2021/0089276 A1 | 3/2021 | Dunn et al. |
| 2021/0089278 A1 | 3/2021 | Dunn et al. |
| 2021/0096526 A1 | 4/2021 | Ericsson et al. |
| 2021/0096704 A1 | 4/2021 | Ericsson et al. |
| 2021/0096827 A1 | 4/2021 | Stump et al. |
| 2021/0294307 A1 | 9/2021 | Onteddu et al. |

(56) References Cited

U.S. PATENT DOCUMENTS

| | | | |
|---|---|---|---|
| 2021/0327303 | A1 | 10/2021 | Buras et al. |
| 2021/0327304 | A1 | 10/2021 | Buras et al. |
| 2021/0397166 | A1 | 12/2021 | SayyarRodsari et al. |
| 2021/0397171 | A1 | 12/2021 | SayyarRodsari et al. |

FOREIGN PATENT DOCUMENTS

| | | | |
|---|---|---|---|
| CN | 101233488 | A | 7/2008 |
| CN | 101241354 | A | 8/2008 |
| CN | 101408762 | A | 4/2009 |
| CN | 101685295 | A | 3/2010 |
| CN | 101720098 | A | 6/2010 |
| CN | 101763280 | A | 6/2010 |
| CN | 102222012 | A | 10/2011 |
| CN | 102906652 | A | 1/2013 |
| CN | 103092756 | A | 5/2013 |
| CN | 103149849 | A | 6/2013 |
| CN | 103765335 | A | 4/2014 |
| CN | 103792857 | A | 5/2014 |
| CN | 103870532 | A | 6/2014 |
| CN | 104049547 | A | 9/2014 |
| CN | 104142630 | A | 11/2014 |
| CN | 104142660 | A | 11/2014 |
| CN | 104144204 | A | 11/2014 |
| CN | 104750062 | A | 7/2015 |
| CN | 104778071 | A | 7/2015 |
| CN | 104950741 | A | 9/2015 |
| CN | 104977874 | A | 10/2015 |
| CN | 105159656 | A | 12/2015 |
| CN | 106383456 | A | 2/2017 |
| CN | 107077574 | A | 8/2017 |
| CN | 107463147 | A | 12/2017 |
| CN | 107589727 | A | 1/2018 |
| CN | 108073277 | A | 5/2018 |
| CN | 108089696 | A | 5/2018 |
| CN | 108628595 | A | 10/2018 |
| CN | 108769064 | A | 11/2018 |
| CN | 108829024 | A | 11/2018 |
| CN | 109062555 | A | 12/2018 |
| CN | 208314755 | U | 1/2019 |
| CN | 109474607 | A | 3/2019 |
| CN | 109558380 | A | 4/2019 |
| CN | 109615265 | A | 4/2019 |
| CN | 109615625 | A | 4/2019 |
| CN | 109726107 | A | 5/2019 |
| CN | 109765836 | A | 5/2019 |
| CN | 109787805 | A | 5/2019 |
| CN | 109840085 | A | 6/2019 |
| CN | 109964181 | A | 7/2019 |
| EP | 1 256 861 | A1 | 11/2002 |
| EP | 1 296 232 | A2 | 3/2003 |
| EP | 2 177 986 | A1 | 4/2010 |
| EP | 2 469 466 | A1 | 6/2012 |
| EP | 2801939 | A1 | 11/2014 |
| EP | 2 927 854 | A1 | 10/2015 |
| EP | 3 101 565 | A1 | 7/2016 |
| EP | 3 070 548 | A2 | 9/2016 |
| EP | 3 318 944 | A2 | 5/2018 |
| EP | 3 376 325 | A1 | 9/2018 |
| EP | 3 418 889 | A1 | 12/2018 |
| EP | 3 511 820 | A1 | 7/2019 |
| EP | 3 798 768 | A2 | 3/2021 |
| KR | 10-2008-0060893 | A | 7/2008 |
| WO | 2008/115644 | A1 | 9/2008 |
| WO | 2014/092694 | A1 | 6/2014 |
| WO | 2016/053337 | A1 | 4/2016 |
| WO | 2016/195690 | A1 | 12/2016 |
| WO | 2019/094729 | A1 | 5/2019 |
| WO | 2019/136754 | A1 | 7/2019 |

OTHER PUBLICATIONS

Arangarasan et al., "Geometric modeling and collaborative design in a multi-modal multi-sensory virtual environment." International Design Engineering Technical Conferences and Computers and Information in Engineering Conference. vol. 35111. American Society of Mechanical Engineers, 2000. (Year: 2000).*

Chan, Stephen CF, and Vincent TY Ng. "Real-time collaborative solid shape design (RCSSD) on the internet." Concurrent Engineering 10.3 (2002): 229-238. (Year: 2002).*

Gruska, Greg, and Chad Kymal. "Use SPC for everyday work processes." Quality progress 39.6 (2006): 25. (Year: 2006).*

Li, Zhi, et al. "Conception and implementation of a collaborative manufacturing grid." The International Journal of Advanced Manufacturing Technology 34.11 (2007): 1224-1235. (Year: 2007).*

Constantinescu, Carmen, et al. D1 Definition of a VR based collaborative digital manufacturing environment. S. 1.]: Information Society Technologies, 2007. (Year: 2007).*

Barbieri, L., et al. "Innovative integration techniques between Virtual Reality systems and CAx tools." The International Journal of Advanced Manufacturing Technology 38 (2008): 1085-1097. (Year: 2008).*

Mahdjoub, Morad, et al. "A collaborative design for usability approach supported by virtual reality and a multi-agent system embedded in a PLM environment." Computer-Aided Design 42.5 (2010): 402-413. (Year: 2010).*

Persson, Joel, and Jesper Norrman. "Virtual Production Line." (2018). (Year: 2018).*

McDonald, Michael J., et al. "Virtual collaborative control to improve intelligent robotic system efficiency and quality." Proceedings of International Conference on Robotics and Automation. vol. 1. IEEE, 1997. (Year: 1997).*

Yang, Guilin, and I-Ming Chen. "Task-based optimization of modular robot configurations: minimized degree-of-freedom approach." Mechanism and machine theory 35.4 (2000): 517-540. (Year: 2000).*

Kuhn, Wolfgang. "Digital factory-simulation enhancing the product and production engineering process." Proceedings of the 2006 winter simulation conference. IEEE, 2006. (Year: 2006).*

Elmaraghy, Waguih, et al. "Complexity in engineering design and manufacturing." CIRP annals 61.2 (2012): 793-814. (Year: 2012).*

Aguirre-Ollinger, Gabriel. "Exoskeleton control for lower-extremity assistance based on adaptive frequency oscillators: Adaptation of muscle activation and movement frequency." Proceedings of the Institution of Mechanical Engineers, Part H: Journal of Engineering in Medicine 229.1 (2015): 52-68. (Year: 2015).*

Zafar, Mohd Nayab, and J. C. Mohanta. "Methodology for path planning and optimization of mobile robots: A review." Procedia computer science 133 (2018): 141-152. (Year: 2018).*

Notification to Grant Patent Right for Invention received for Chinese Patent Application Serial No. 202010238979.1 dated Dec. 27, 2023, 3 pages(Including English Translation).

Notification to Grant Patent Right for Invention received for Chinese Patent Application Serial No. 202110348457.1 dated Oct. 23, 2023, 3 pages(Including English Translation).

Second Office Action received for Chinese Patent Application Serial No. 202010250230.9 dated Nov. 10, 2023, 7 pages(Including English Translation).

Notification to Grant Patent Right for Invention received for Chinese Patent Application Serial No. 202010250230.9 dated Jan. 4, 2024, 3 pages(Including English Translation).

Notice of Allowance received for U.S. Appl. No. 18/304,446 dated Jan. 22, 2024, 157 pages.

Notice of Allowance received for U.S. Appl. No. 17/842,871 dated Sep. 13, 2023, 154 pages.

Weyrich et al., "An Interactive Environment for Virtual Manufacturing: The Virtual Workbench", Computers in Industry, vol. 38, 1999, 11 pages.

Mujber et al., "Virtual Reality Applications in Manufacturing Process Simulation", Journal of Materials Processing Technology, vol. 155-156, 2004, 5 pages.

Tuma et al., "The Process Simulation using by Virtual Reality", Procedia Engineering, vol. 69, 2014, 6 pages.

Rodriguez et al., "Developing a Mixed Reality Assistance System based on Projection Mapping Technology for Manual Operations at Assembly Workstations", Procedia Computer Science, vol. 75, 2015, 7 pages.

(56) References Cited

OTHER PUBLICATIONS

Dorozhkin et al., "Coupling of Interactive Manufacturing Operations Simulation and Immersive Virtual Reality", Virtual Reality, vol. 16, 2010, 14 pages.
Notice of Allowance received for U.S. Appl. No. 16/584,415 dated Jul. 21, 2023, 12 pages.
Notice of Allowance received for U.S. Appl. No. 18/185,525 dated Jul. 7, 2023, 171 pages.
Notice of Allowance received for U.S. Appl. No. 18/185,525 dated Jul. 12, 2023, 20 pages.
Non-Final office action received for U.S. Appl. No. 17/471,544 dated Aug. 30, 2023, 89 pages.
Communication pursuant to Article 94(3) EPC received for EP Patent Application Serial No. 20166286.3 dated Jul. 27, 2023, 8 pages.
Office Action received for Chinese Patent Application Serial No. 202010236312.8 dated Aug. 31, 2023, 8 pages (English Translation Only).
Non-Final office action received for U.S. Appl. No. 16/584,415 dated Oct. 6, 2022, 72 Pages.
Non-Final office action received for U.S. Appl. No. 17/340,931 dated Oct. 12, 2022, 108 Pages.
Non-Final office action received for U.S. Appl. No. 17/340,861 dated Oct. 7, 2022, 102 Pages.
Non-Final office action received for U.S. Appl. No. 17/692,454 dated Oct. 13, 2022, 46 Pages.
Notice of Allowance received for U.S. Appl. No. 17/340,861 dated Dec. 30, 2022, 105 pages.
Notice of Allowance received for U.S. Appl. No. 17/692,454 dated Jan. 19, 2023, 18 pages.
Communication pursuant to Article 94(3) EPC received for European Patent Application Serial No. 20166284.8 dated Oct. 14, 2022, 6 pages.
Communication pursuant to Article 94(3) EPC received for European Patent Application Serial No. 20166776.3 dated Nov. 23, 2022, 7 pages.
Communication pursuant to Article 94(3) EPC received for European Patent Application Serial No. 21165314.2 dated Dec. 23, 2022, 6 pages.
Notice of Allowance received for U.S. Appl. No. 17/340,931 dated Jan. 24, 2023, 248 pages.
Notice of Allowance received for U.S. Appl. No. 17/340,861 dated Feb. 2, 2023, 6 pages.
Notice of Allowance received for U.S. Appl. No. 17/570,552 dated Feb. 3, 2023, 68 pages.
Notice of Allowance received for U.S. Appl. No. 17/570,552 dated Feb. 15, 2023, 9 pages.
Notice of Allowance received for U.S. Appl. No. 17/692,454 dated Feb. 1, 2023, 6 pages.
Communication pursuant to Article 94(3) EPC received for European Patent Application Serial No. 20166772.2 dated Mar. 10, 2023, 6 pages.
Decision to grant a European patent pursuant to Article 97(1) EPC received for European Patent Application Serial No. 20166680.7 dated Nov. 4, 2022, 2 pages.
Notice of Allowance received for U.S. Appl. No. 16/584,415 dated Mar. 15, 2023, 73 pages.
Non-Final office action received for U.S. Appl. No. 17/842,871 dated Mar. 28, 2023, 106 Pages.
Notice of Allowance received for U.S. Appl. No. 16/584,415 dated Mar. 31, 2023, 6 pages.
Notice of Allowance received for U.S. Appl. No. 17/340,931 dated Mar. 29, 2023, 8 pages.
Notice of Allowance received for U.S. Appl. No. 17/570,552 dated Mar. 27, 2023, 6 pages.
Notice of Allowance received for U.S. Appl. No. 17/692,454 dated Mar. 31, 2023, 8 pages.
Extended European Search Report received for EP Patent Application Serial No. 20167073.4 dated May 28, 2020, 11 pages.

Iriondo et al., "Automatic Generation of the Supervisor Code for Industrial Switched-Mode Systems", IEEE Transactions on Industrial Informatics, IEEE Service Center, vol. 9, No. 4, Nov. 1, 2013, pp. 1868-1878.
Wikipedia, "Semi-supervised learning", URL: https://en.wikipedia.org/w/index.php?title=Semi-supervisedlearning&oldid=900515496, Jun. 6, 2019, pp. 1-7.
Non-final office action received for U.S. Appl. No. 16/580,672 dated Oct. 1, 2020, 106 Pages.
Grundy et al.; "Generating Domain-Specific Visual Language Tools from Abstract Visual Specifications"; IEEE Transactions on Software Engineering, vol. 39, No. 4 (pp. 487-515); Apr. 2013 (Year: 2013).
Salihbegovic et al.; "Design of a Domain Specific Language and IDE for Internet of Things Applications"; 38th International Convention on Information and Communication Technology, Electronics and Microelectronics (MIPRO) (pp. 996-1001); 2015 (Year:2015).
Schmitt et al.; "An Evaluation of Domain-Specific Language Technologies for Code Generation"; 14th International Conference on Computational Science and Its Applications (pp. 18-26); 2014 (Year: 2014).
Dwarakanath et al.; "Accelerating Test Automation Through a Domain Specific Language"; IEEE International Conference on Software Testing, Verification and Validation (ICST) (pp. 460-467); 2017 (Year: 2017).
Preuer, Stefan; "A Domain-Specific Language for Industrial Automation"; Software Engineering 2007-Beitrage zu den Workshops-Fachtagung des GI-Fachbereichs Softwaretechnik. Gesellschaft fi.ir Informatik e. V., 2007 (Year: 2007).
Vyatkin, Valeriy; "Software Engineering in Industrial Automation: State-of-the-Art Review"; IEEE Transactions on Industrial Informatics 9.3: (pp. 1234-1249); 2013 (Year: 2013).
"NetBeans IDE"; Netbeans.org website [full url in ref.]; Oct. 1, 2012 (Year: 2012).
Notice of allowance received for U.S. Appl. No. 16/580,672 dated Oct. 30, 2020, 23 Pages.
Non-final office action received for U.S. Appl. No. 16/580,581 dated Oct. 20, 2020, 51 Pages.
Non final office action received for U.S. Appl. No. 16/584,298 dated Oct. 20, 2020, 63 Pages.
Non-final office action received for U.S. Appl. No. 16/584,368 dated Nov. 18, 2020, 44 Pages.
Non final office action received for U.S. Appl. No. 16/584,470 dated Feb. 18, 2021, 46 Pages.
Extended European Search Report for European Application No. 20166286.3 1224, dated Jan. 29, 2021, 12 pages.
Eclipse: "Using JavaScript Syntax Coloring," Mar. 5, 2019. Retrieved from internet Jan. 20, 2021. https://web.archive.org/web/20190305182138/http://www.eclipse.org:80/pdUhelp/html/using_javascript_syntax_coloring.htm.
Extended European Search Report received for European Patent Application No. 20166776.3—1202, dated Feb. 24, 2021, 10 pages.
Extended European Search Report received for European Patent Application No. 20167085.8—1224, dated Feb. 5, 2021, 8 Pages.
European Search Report for European patent Application No. 20166772.2 1202, dated Feb. 3, 2021, 17 pages.
Extended European Search Report received for European Application No. 20166680.7, dated Jan. 22, 2021, 10 pages.
Extended European search report received for European Patent Application No. 20166772.2, dated Apr. 23, 2021, 15 pages.
Extended European search report received for European Application No. 20166284.8, dated Feb. 17, 2021, 08 pages.
Communication pursuant to Rule 69 EPC received for European Patent Application Serial No. 20166284.8 dated Apr. 7, 2021, 2 pages.
Communication pursuant to Rule 69 EPC received for European Patent Application Serial No. 20167085.8 dated Apr. 7, 2021, 2 pages.
Communication pursuant to Rule 69 EPC received for European Patent Application Serial No. 20166680.7 dated Apr. 7, 2021, 2 pages.

(56) References Cited

OTHER PUBLICATIONS

Communication pursuant to Rule 69 EPC received for European Patent Application Serial No. 20167073.4 dated Apr. 7, 2021, 2 pages.
Communication pursuant to Rule 69 EPC received for European Patent Application Serial No. 20166776.3 dated Apr. 7, 2021, 2 pages.
Communication pursuant to Rule 69 EPC received for European Patent Application Serial No. 20166286.3 dated Apr. 7, 2021, 2 pages.
Non final office action received for U.S. Appl. No. 16/584,210 dated Aug. 30, 2021, 60 Pages.
Communication pursuant to Rule 69 EPC received for European Patent Application Serial No. 20166772.2 dated May 31, 2021, 2 pages.
Non final office action received for U.S. Appl. No. 16/838,330 dated Aug. 5, 2021, 56 Pages.
Notice of Allowance received for U.S. Appl. No. 17/157,185 dated Nov. 1, 2021, 51 Pages.
Notice of Allowance received for U.S. Appl. No. 16/838,330 dated Dec. 20, 2021, 78 Pages.
Ewenike, S., et al., Cloud Based Collaborative Software Development: A Review, Gap Analysis and Future Directions, 2017 IEEE/ACS 14th International Conference on Computer Systems and Applications, pp. 901-909, 2017, [retrieved on Nov. 26, 2021], Retrieved from the Internet: <URL:http://ieeexplore.ieee.org/>.
Figueiredo, M., et al., Wolf: Supporting Impact Analysis Activities in Distributed Software Development, 2012 5th International Workshop on Co-operative and Human Aspects of Software Engineering (CHASE), pp. 40-46, Jun. 2012, [retrieved on Nov. 26, 2021], Retrieved from the Internet: <URL:http://ieeexplore.ieee.org/>.
Communication pursuant to Article 94(3) EPC received for European Patent Application Serial No. 20167073.4 dated Oct. 27, 2021, 9 pages.
Communication pursuant to Rule 69 EPC received for European Patent Application Serial No. 20166680.7 dated Nov. 30, 2021, 3 pages.
Extended European Search Report received for European Patent Application Serial No. 21165314.2 dated Aug. 18, 2021, 13 pages.
Communication pursuant to Rule 69 EPC received European Patent Application Serial No. 21165314.2 dated Oct. 11, 2021, 2 pages.
Notice of Allowance received for U.S. Appl. No. 16/584,210 dated Mar. 21, 2022, 112 pages.
Zhang et al., "Design and Interaction Interface Using Augmented Reality for Smart Manufacturing", Procedia Manufacturing, vol. 26, 2018, pp. 1278-1286.
Rabah et al., "Towards Improving the Future of Manufacturing Through Digital Twin and Augmented Reality Technologies", Procedia Manufacturing, vol. 17, 2018, pp. 460-467.
Havard et al., "Digital Twin and Virtual Reality: a Co-simulation Environment for Design and Assessment of Industrial Workstations", Production & Manufacturing Research, vol. 7, No. 1, 2019, pp. 472-489.
Grajewski et al., "Application of Virtual Reality Techniques in Design of Ergonomic Manufacturing Workplaces", Procedia Computer Science, vol. 25, 2013, pp. 289-301.
Zaldfvar-Colado et al., "Mixed Reality for Virtual Assembly", 26th IEEE International Symposium on Robot and Human Interactive Communication (RO-MAN), 2017, pp. 739-744.
Coburn et al., "A Review of the Capabilities of Current Low-Cost Virtual Reality Technology and its Potential to Enhance the Design Process", Journal of Computing and Information Science in Engineering, vol. 17, Sep. 2017, pp. 031013-1-031013-1-15.
Communication pursuant to Article 94(3) EPC received for E.P Patent Application Serial No. 20166286.3 dated Jul. 6, 2022, 5 pages.
Communication pursuant to Article 94(3) EPC received for E.P Patent Application Serial No. 20167073.4 dated Aug. 11, 2022, 8 pages.
Notice of Allowance received for U.S. Appl. No. 17/842,871 dated Oct. 26, 2023, 10 pages.
Notice of Allowance received for U.S. Appl. No. 18/185,525 dated Oct. 17, 2023, 7 pages.
First Office Action received for Chinese Patent Application Serial No. 202010250230.9 dated Sep. 16, 2023, 21 pages.
Second Office Action received for Chinese Patent Application Serial No. 202010236313.2 dated Nov. 8, 2023, 8 pages.
First Office Action received for Chinese Patent Application Serial No. 202010237482.8 dated Sep. 22, 2023, 19 pages.
First Office Action received for Chinese Patent Application Serial No. 202010238979.1 dated Sep. 28, 2023, 17 pages.
Wang, Weiting, "Analyzing the International Standard IEC61131-3 for Industrial Programming Languages", International Mechatronics Technology, Issue 02, Mar. 30, 2007.
Notice of Allowance received for U.S. Appl. No. 18/304,446 dated Apr. 30, 2024, 11 pages.
Notice of Allowance received for U.S. Appl. No. 17/471,544 dated May 22, 2024, 11 pages.
Non-Final Office Action received for U.S. Appl. No. 18/304,480 dated May 16, 2024, 163 pages.
Communication pursuant to Article 94(3) EPC received for European Patent Application Serial No. 21165314.2 dated Jun. 3, 2024, 4 pages.
Notice of Allowance received for U.S. Appl. No. 17/471,544 dated Mar. 6, 2024, 52 pages.
Notification to Grant Patent Right for Invention received for Chinese Patent Application Serial No. 202010236313.2 dated Feb. 7, 2024, 3 pages(Including English Translation).
First Office Action received for Chinese Patent Application Serial No. 202010236313.2 dated Aug. 30, 2023, 19 pages(Including English Translation).
Notification to Grant Patent Right for Invention received for Chinese Patent Application Serial No. 202010237482.8 dated Dec. 1, 2023, 3 pages(Including English Translation).
Second Office Action received for Chinese Patent Application Serial No. 202010237335.0 dated Nov. 8, 2023, 8 pages(Including English Translation).
First Office Action received for Chinese Patent Application Serial No. 202010237335.0 dated Aug. 31, 2023, 23 pages(Including English Translation).
Notification to Grant Patent Right for Invention received for Chinese Patent Application Serial No. 202010237335.0 dated Mar. 12, 2024, 3 pages(Including English Translation).
Notice of Allowance received for U.S. Appl. No. 18/304,446 dated Feb. 28, 2024, 4 pages.
First Office Action received for Chinese Patent Application Serial No. 202010237332.7 dated Sep. 1, 2023, 22 pages(Including English Translation).
Second Office Action received for Chinese Patent Application Serial No. 202010237332.7 dated Nov. 9, 2023, 7 pages(Including English Translation).
Notification to Grant Patent Right for Invention received for Chinese Patent Application Serial No. 202010237332.7 dated Feb. 7, 2024, 3 pages(Including English Translation).
Communication pursuant to Article 94(3) EPC received for EP Patent Application Serial No. 20167073.4 dated Mar. 23, 2023, 11 pages.
Communication pursuant to Article 94(3) EPC received for EP Patent Application Serial No. 20166284.8 dated May 17, 2023, 6 pages.
Notice of Allowance received for U.S. Appl. No. 18/304,480 dated Aug. 29, 2024.
Communication pursuant to Article 94(3) EPC received for European Patent Application Serial No. 20167085.8 dated Nov. 4, 2024, 6 pages.
Communication pursuant to Article 94(3) EPC received for European Patent Application Serial No. 20167085.8 dated Jun. 26, 2025, 4 pages.

* cited by examiner

COLLABORATION TOOLS

CROSS-REFERENCE TO RELATED APPLICATIONS

This application is a continuation of, and claims priority to, U.S. patent application Ser. No. 16/584,415, filed on Sep. 26, 2019, and entitled "COLLABORATION TOOLS," the entirety of which is incorporated herein by reference.

BACKGROUND

The subject matter disclosed herein relates generally to industrial automation systems, and, for example, to industrial programming development platforms

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for collaboratively developing industrial applications is provided, comprising a user interface component configured to render integrated development environment (IDE) interfaces on respective client devices and to receive, via interaction with the IDE interfaces, industrial design input that defines aspects of an industrial automation control project; a project generation component configured to generate system project data based on the industrial design input; and a collaboration management component configured to broker between multiple sets of the industrial design input submitted via different client devices of the client devices for inclusion in the system project data.

Also, one or more embodiments provide a method for collaborative development of industrial control applications, comprising rendering, by a system comprising a processor, integrated development environment (IDE) interfaces on respective client devices; receiving, by the system via interaction with the IDE interfaces, industrial design input received from the client devices that defines aspects of an industrial control and monitoring project; generating, by the system, system project data based on the industrial design input; and selecting, by the system, from among multiple sets of the industrial design input submitted via the respective client devices for inclusion in the system project data.

Also, according to one or more embodiments, a non-transitory computer-readable medium is provided having stored thereon instructions that, in response to execution, cause a system to perform operations, the operations comprising rendering integrated development environment (IDE) interfaces on respective client devices; receiving, via interaction with the IDE interfaces, industrial design input received from the client devices that defines aspects of an industrial automation project; generating system project data based on the industrial design input; and brokering between multiple sets of the industrial design input submitted via the respective client devices for integration into the system project data.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
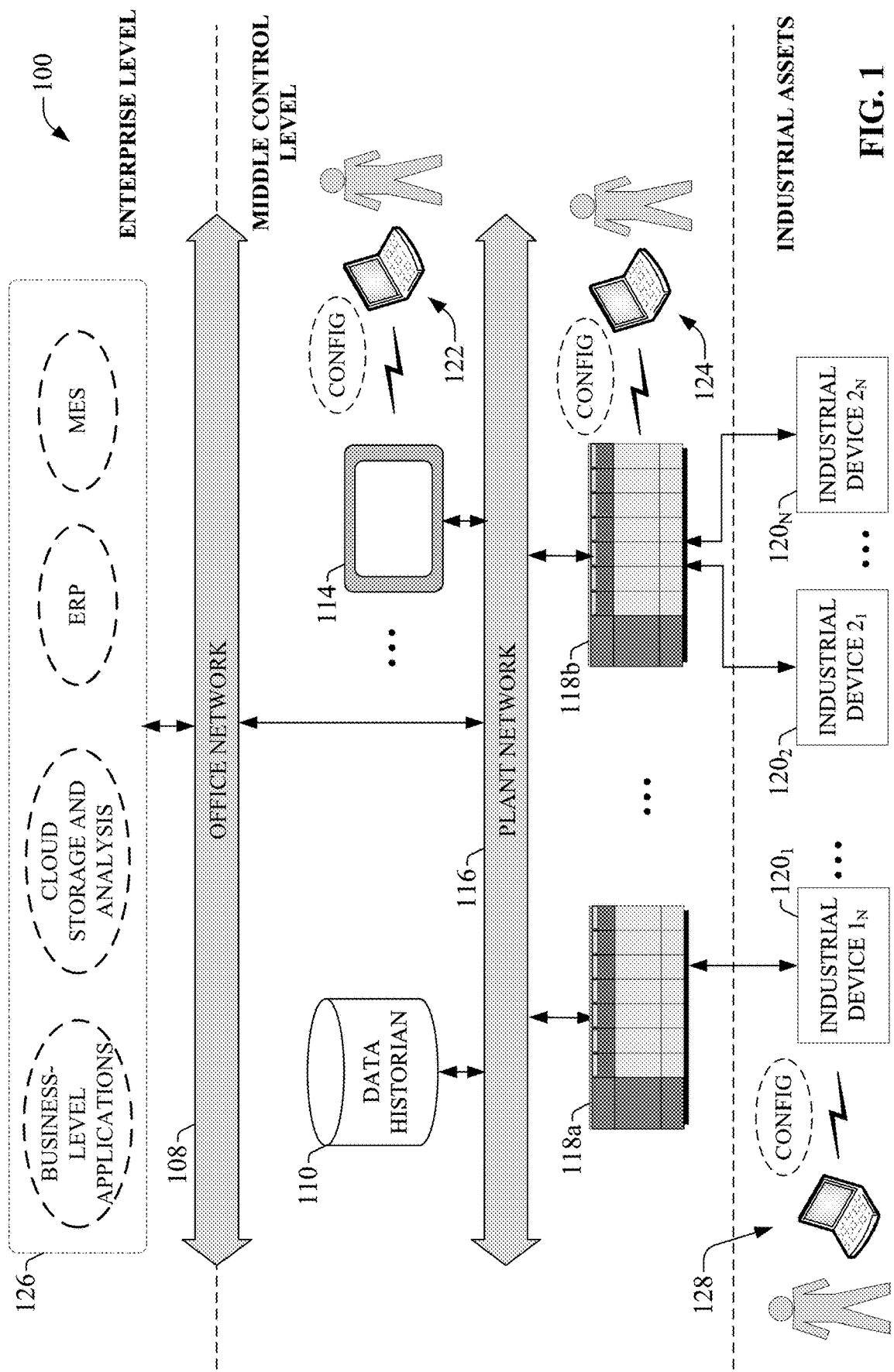
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledge-bases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMIs 114 using an HMI development platform (e.g., executing on client device 122) and download the resulting visualization files to the HMI 114. Some industrial devices 120—such as motor drives, telemetry devices, safety input devices, etc.—may also require configuration using separate device configuration tools (e.g., executing on client device 128) that are specific to the device being configured. Such device configuration tools may be used to set device parameters or operating modes (e.g., high/low limits, output signal formats, scale factors, energy consumption modes, etc.).

The necessity of using separate configuration tools to program and configure disparate aspects of an industrial automation system results in a piecemeal design approach whereby different but related or overlapping aspects of an automation system are designed, configured, and programmed separately on different development environments. For example, a motion control system may require an industrial controller to be programmed and a control loop to be tuned using a control logic programming platform, a motor drive to be configured using another configuration platform, and an associated HMI to be programmed using a visualization development platform. Related peripheral systems—such as vision systems, safety systems, etc.—may also require configuration using separate programming or development applications.

This segregated development approach can also necessitate considerable testing and debugging efforts to ensure proper integration of the separately configured system aspects. In this regard, intended data interfacing or coordinated actions between the different system aspects may require significant debugging due to a failure to properly coordinate disparate programming efforts.

Industrial development platforms are also limited in their ability to support a collaborative development environment that allows multiple developers to work on a given automation system project in parallel.

To address at least some of these or other issues, one or more embodiments described herein provide an integrated development environment (IDE) for designing, programming, and configuring multiple aspects of an industrial automation system using a common design environment and data model. Embodiments of the industrial IDE can be used to configure and manage automation system devices in a common way, facilitating integrated, multi-discipline programming of control, visualization, and other aspects of the control system.

In general, the industrial IDE supports features that span the full automation lifecycle, including design (e.g., device selection and sizing, controller programming, visualization development, device configuration, testing, etc.); installation, configuration and commissioning; operation, improvement, and administration; and troubleshooting, expanding, and upgrading.

Embodiments of the industrial IDE can include a library of modular code and visualizations that are specific to industry verticals and common industrial applications within those verticals. These code and visualization modules can simplify development and shorten the development cycle, while also supporting consistency and reuse across an industrial enterprise.

Cloud-based embodiments of the industrial IDE can also support collaborative tools that allow multiple designers and programmers to remotely submit design input to the same automation system project in parallel while maintaining project consistency. These collaborative features can include, for example, brokering between different sets of design input directed to the same portion of the system project, generating notifications to remote designers when a portion of the system project is modified, sharing of development interfaces or environments, facilitating involvement of outside technical support experts to assist with design issues, or other such features.

Figure 2:
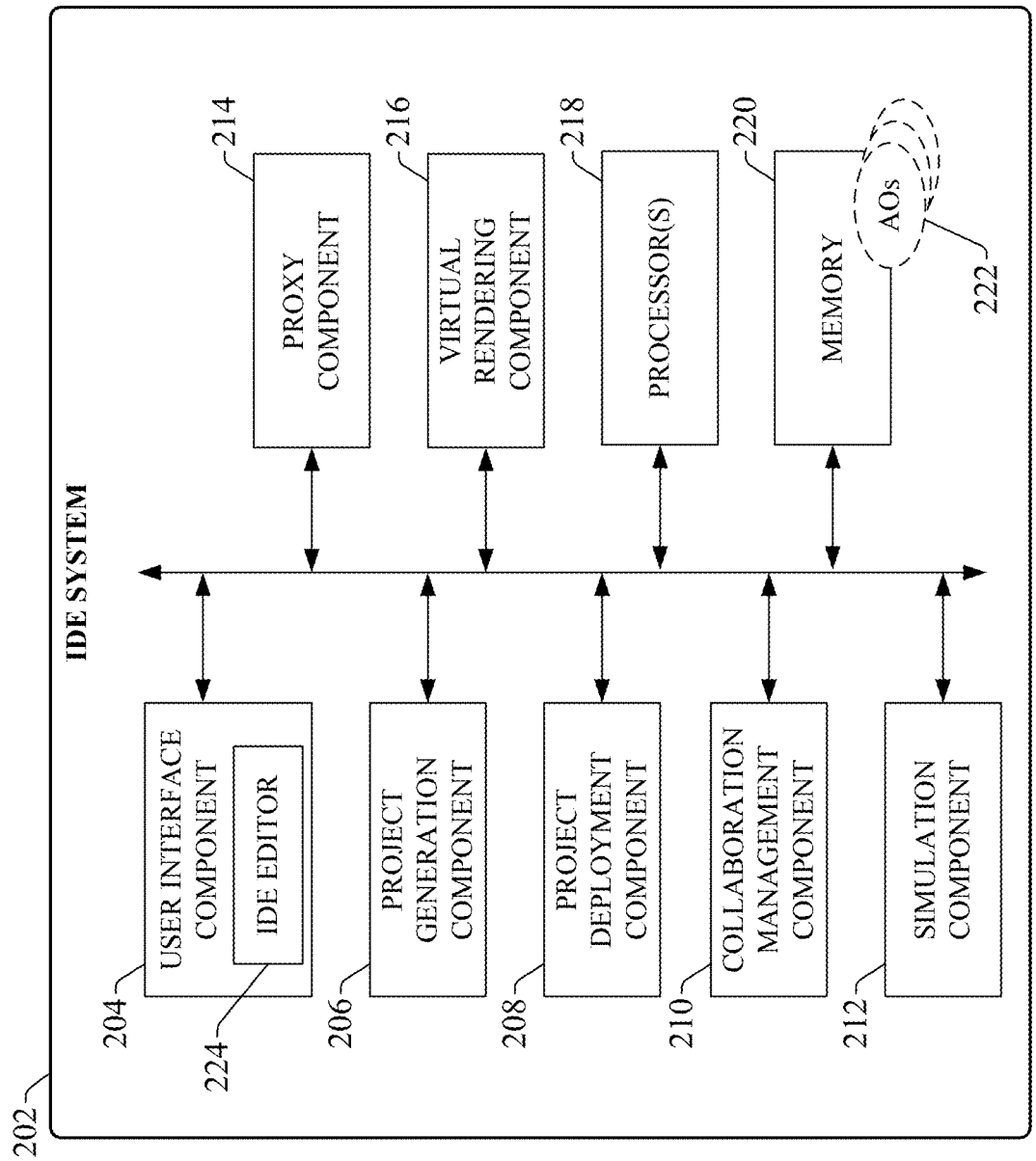
FIG. 2 is a block diagram of an example integrated development environment (IDE) system.

FIG. 2 is a block diagram of an example integrated development environment (IDE) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 202 can include a user interface component 204 including an IDE editor 224, a project generation component 206, a project deployment component 208, a collaboration management component 210, a simulation component 212, a proxy component 214, a virtual rendering component 216, one or more processors 218, and memory 220. In various embodiments, one or more of the user interface component 204, project generation component 206, project deployment component 208, collaboration management component 210, simulation component 212, proxy component 214, virtual rendering component 216, the one or more processors 218, and memory 220 can be electrically and/or communicatively coupled to one another to perform one or more of the functions of the IDE system 202. In some embodiments, components 204, 206, 208, 210, 212, 214, and 216 can comprise software instructions stored on memory 220 and executed by processor(s) 218. IDE system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with an IDE client that executes on a client device (e.g., a laptop computer, tablet computer, smart phone, etc.) that is communicatively connected to the IDE system 202 (e.g., via a hardwired or wireless connection). The user interface component 204 can then receive user input data and render output data via the IDE client. In other embodiments, user interface component 314 can be configured to generate and serve suitable interface screens to a client device (e.g., program development screens), and exchange data via these interface screens. Input data that can be received via various embodiments of user interface component 204 can include, but is not limited to, programming code, industrial design specifications or goals, engineering drawings, AR/VR input, DSL definitions, video or image data, or other such input. Output data rendered by various embodiments of user interface component 204 can include program code, programming feedback (e.g., error and highlighting, coding suggestions, etc.), programming and visualization development screens, etc.

Project generation component 206 can be configured to create a system project comprising one or more project files based on design input received via the user interface component 204, as well as industrial knowledge, predefined code modules and visualizations, and automation objects 222 maintained by the IDE system 202. Project deployment component 208 can be configured to commission the system project created by the project generation component 206 to appropriate industrial devices (e.g., controllers, HMI terminals, motor drives, AR/VR systems, etc.) for execution. To this end, project deployment component 208 can identify the appropriate target devices to which respective portions of the system project should be sent for execution, translate these respective portions to formats understandable by the target devices, and deploy the translated project components to their corresponding devices.

Collaboration management component 210 can be configured to manage and regulate design input submitted by multiple developers in a manner that ensures project consistency and coordination between developers. Simulation component 212 can be configured to perform test simulations on different versions of design input directed to a common aspect of a system project and submit the results to the collaboration management component 210 for the purposes of selecting between the different design ideas for inclusion in the system project. Proxy component 214 can be configured to manage connectivity and sharing of project information between developers and remote technical support.

Virtual rendering component 210 can be configured to render-via user interface component 204—a virtual reality (VR) presentation of an industrial facility or installation area on a user's wearable appliance, and translate user interactions with the VR presentation. The VR presentation can be generated based on a digital plant model stored on the IDE system 202. The user's interactions with the VR presentation can be interpreted as design specifications for a new automation system, or specifications for modifying the design or operation of an existing automation system, and translated to project data satisfying the design specifications by the project generation component 206. This project data can include, for example, controller code; visualization objects, dashboards, or mashups; device configurations; bills of materials; equipment recommendations; engineering drawings; or other such project components.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
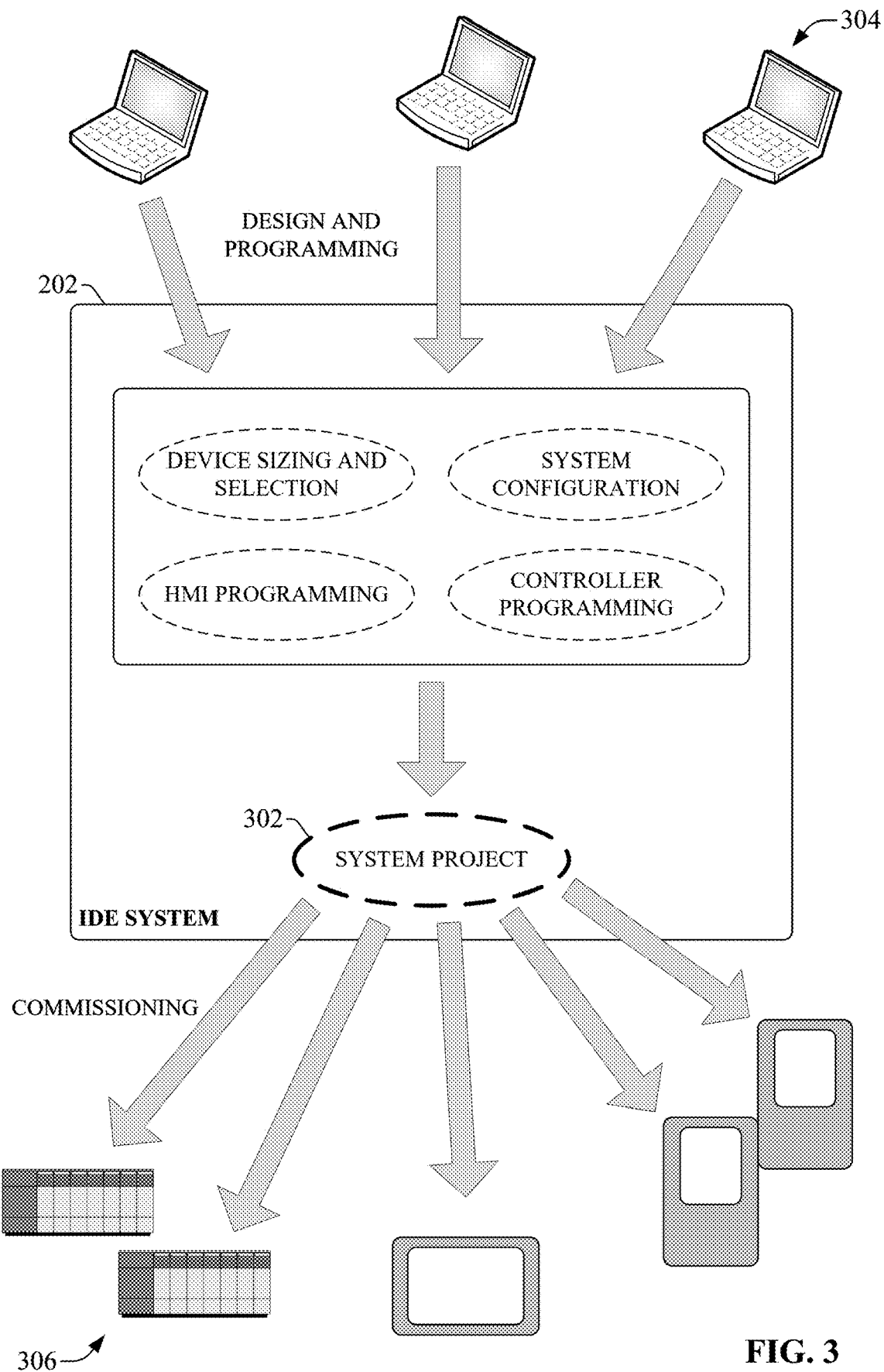
FIG. 3 is a diagram illustrating a generalized architecture of an industrial IDE system.

FIG. 3 is a diagram illustrating a generalized architecture of the industrial IDE system 202 according to one or more embodiments. Industrial IDE system 202 can implement a common set of services and workflows spanning not only design, but also commissioning, operation, and maintenance. In terms of design, the IDE system 202 can support not only industrial controller programming and HMI development, but also sizing and selection of system components, device/system configuration, AR/VR visualizations, and other features. The IDE system 202 can also include tools that simplify and automate commissioning of the resulting project and assist with subsequent administration of the deployed system during runtime.

Embodiments of the IDE system 202 that are implemented on a cloud platform also facilitate collaborative project development whereby multiple developers 304 contribute design and programming input to a common automation system project 302. Collaborative tools supported by the IDE system can manage design contributions from the multiple contributors and perform version control of the aggregate system project 302 to ensure project consistency. Collaborative features supported by the industrial IDE system are described in more detail herein.

Based on design and programming input from one or more developers 304, IDE system 202 generates a system project 302 comprising one or more project files. The system project 302 encodes one or more of control programming; HMI, AR, and/or VR visualizations; device or sub-system configuration data (e.g., drive parameters, vision system configurations, telemetry device parameters, safety zone definitions, etc.); or other such aspects of an industrial automation system being designed. IDE system 202 can identify the appropriate target devices 306 on which respective aspects of the system project 302 should be executed (e.g., industrial controllers, HMI terminals, variable frequency drives, safety devices, etc.), translate the system project 302 to executable files that can be executed on the respective target devices, and deploy the executable files to their corresponding target devices 306 for execution, thereby commissioning the system project 302 to the plant floor for implementation of the automation project.

Figure 4:
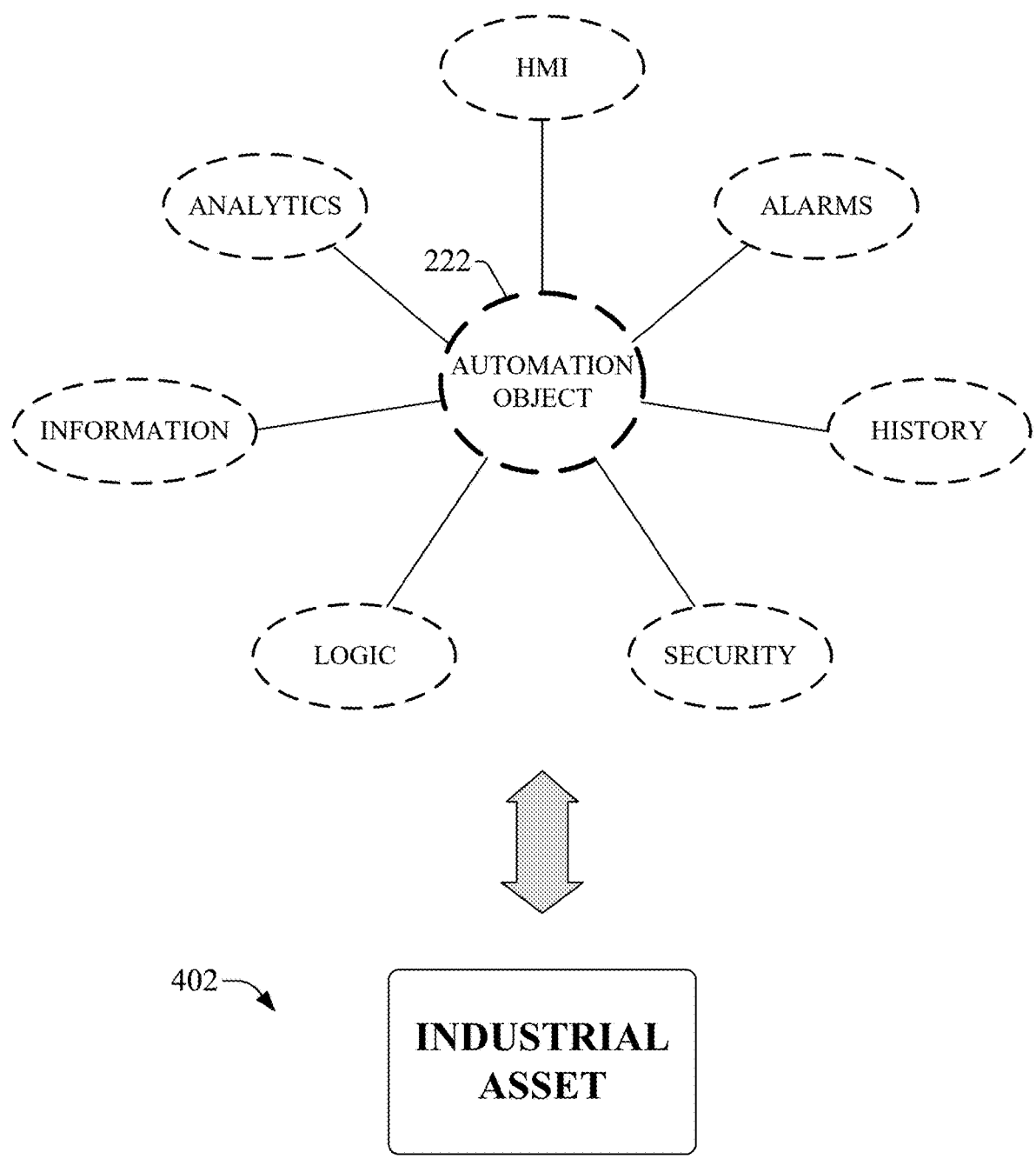
FIG. 4 is a diagram illustrating several example automation object properties that can be leveraged by the IDE system in connection with building, deploying, and executing a system project.

To support enhanced development capabilities, some embodiments of IDE system 202 can be built on an object-based data model rather than a tag-based architecture. Automation objects 222 serve as the building block for this object-based development architecture. FIG. 4 is a diagram illustrating several example automation object properties that can be leveraged by the IDE system 202 in connection with building, deploying, and executing a system project 302. Automation objects 222 can be created and augmented during design, integrated into larger data models, and consumed during runtime. These automation objects 222 provide a common data structure across the IDE system 202 and can be stored in an object library (e.g., part of memory 220) for reuse. The object library can store predefined automation objects 222 representing various classifications of real-world industrial assets 402, including but not limited to pumps, tanks, values, motors, motor drives (e.g., variable frequency drives), industrial robots, actuators (e.g., pneumatic or hydraulic actuators), or other such assets. Automation objects 222 can represent elements at substantially any level of an industrial enterprise, including individual devices, machines made up of many industrial devices and components (some of which may be associated with their own automation objects 222), and entire production lines or process control systems.

An automation object 222 for a given type of industrial asset can encode such aspects as 2D or 3D visualizations, alarms, control coding (e.g., logic or other type of control programming), analytics, startup procedures, testing protocols, validation reports, simulations, schematics, security protocols, and other such properties associated with the industrial asset 402 represented by the object 222. Automation objects 222 can also be geotagged with location information identifying the location of the associated asset. During runtime of the system project 302, the automation object 222 corresponding to a given real-world asset 402 can also record status or operational history data for the asset. In general, automation objects 222 serve as programmatic representations of their corresponding industrial assets 402 and can be incorporated into a system project 302 as elements of control code, a 2D or 3D visualization, a knowledgebase or maintenance guidance system for the industrial assets, or other such aspects.

Figure 5:
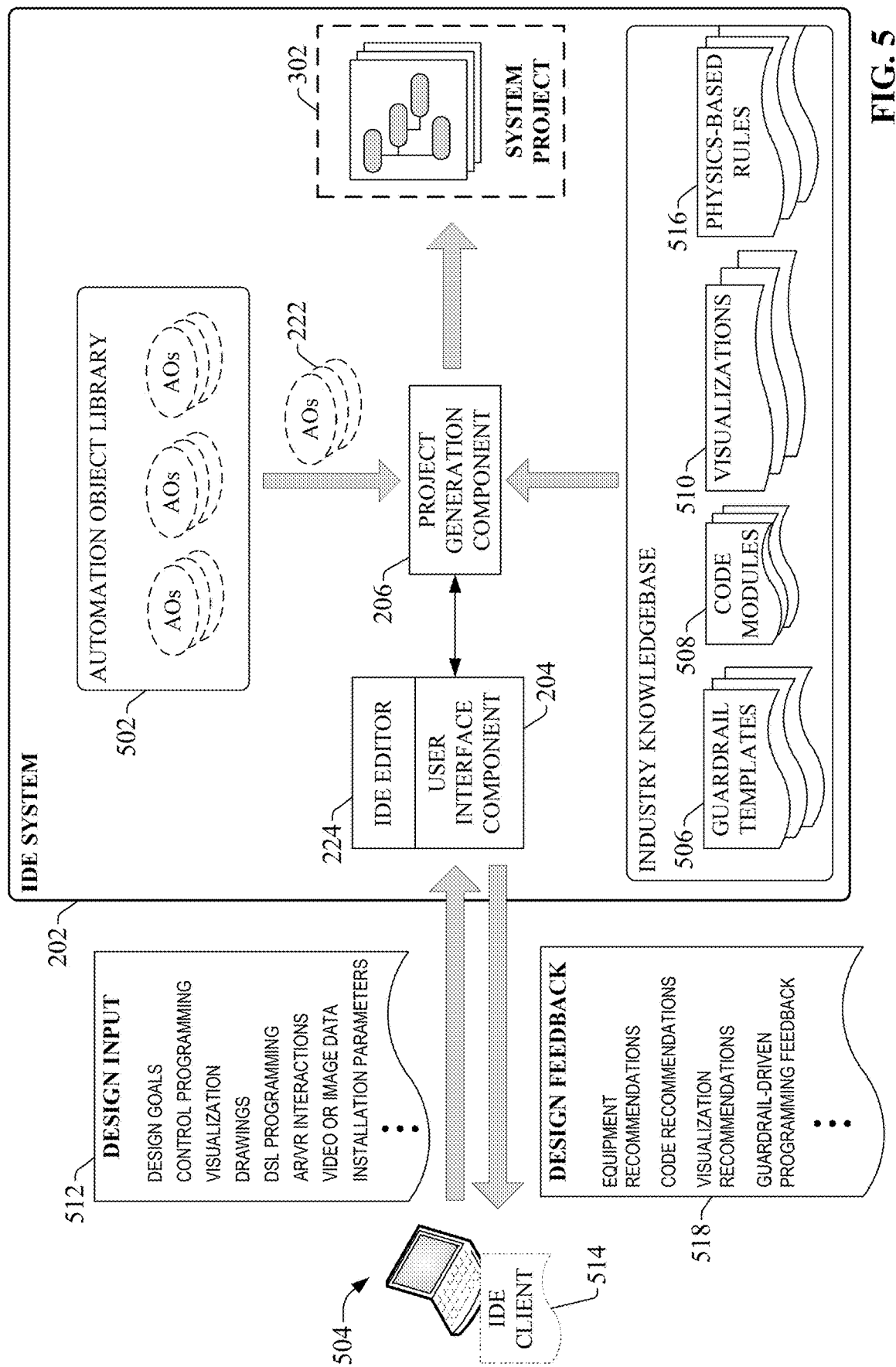
FIG. 5 is a diagram illustrating example data flows associated with creation of a system project for an automation system being designed using an industrial IDE system.

FIG. 5 is a diagram illustrating example data flows associated with creation of a system project 302 for an automation system being designed using IDE system 202 according to one or more embodiments. A client device 504 (e.g., a laptop computer, tablet computer, desktop computer, mobile device, wearable AR/VR appliance, etc.) executing an IDE client application 514 can access the IDE system's project development tools and leverage these tools to create a comprehensive system project 302 for an automation system being developed. Through interaction with the system's user interface component 204, developers can submit design input 512 to the IDE system 202 in various supported formats, including industry-specific control programming (e.g., control logic, structured text, sequential function charts, etc.) and HMI screen configuration input. Based on this design input 512 and information stored in an industry knowledgebase (predefined code modules 508 and visualizations 510, guardrail templates 506, physics-based rules 516, etc.), user interface component 204 renders design feedback 518 designed to assist the developer in connection with developing a system project 302 for configuration, control, and visualization of an industrial automation system.

In addition to control programming and visualization definitions, some embodiments of IDE system 202 can be configured to receive digital engineering drawings (e.g., computer-aided design (CAD) files) as design input 512. In such embodiments, project generation component 206 can generate portions of the system project 302—e.g., by automatically generating control and/or visualization code—based on analysis of existing design drawings. Drawings that can be submitted as design input 512 can include, but are not limited to, P&ID drawings, mechanical drawings, flow diagrams, or other such documents. For example, a P&ID drawing can be imported into the IDE system 202, and project generation component 206 can identify elements (e.g., tanks, pumps, etc.) and relationships therebetween conveyed by the drawings. Project generation component 206 can associate or map elements identified in the drawings with appropriate automation objects 222 corresponding to these elements (e.g., tanks, pumps, etc.) and add these automation objects 222 to the system project 302. The device-specific and asset-specific automation objects 222 include suitable code and visualizations to be associated with the elements identified in the drawings. In general, the IDE system 202 can examine one or more different types of drawings (mechanical, electrical, piping, etc.) to determine relationships between devices, machines, and/or assets (including identifying common elements across different drawings) and intelligently associate these elements with appropriate automation objects 222, code modules 508, and/or visualizations 510. The IDE system 202 can leverage physics-based rules 516 as well as pre-defined code modules 508 and visualizations 510 as necessary in connection with generating code or project data for system project 302.

The IDE system 202 can also determine whether pre-defined visualization content is available for any of the objects discovered in the drawings and generate appropriate HMI screens or AR/VR content for the discovered objects based on these pre-defined visualizations. To this end, the IDE system 202 can store industry-specific, asset-specific, and/or application-specific visualizations 510 that can be accessed by the project generation component 206 as needed. These visualizations 510 can be classified according to industry or industrial vertical (e.g., automotive, food and drug, oil and gas, pharmaceutical, etc.), type of industrial asset (e.g., a type of machine or industrial device), a type of industrial application (e.g., batch processing, flow control, web tension control, sheet metal stamping, water treatment, etc.), or other such categories. Predefined visualizations 510 can comprise visualizations in a variety of formats, including but not limited to HMI screens or windows, mashups that aggregate data from multiple pre-specified sources, AR overlays, VR objects representing 3D virtualizations of the associated industrial asset, or other such visualization formats. IDE system 202 can select a suitable visualization for a given object based on a predefined association between the object type and the visualization content.

In another example, markings applied to an engineering drawing by a user can be understood by some embodiments of the project generation component 206 to convey a specific design intention or parameter. For example, a marking in red pen can be understood to indicate a safety zone, two circles connected by a dashed line can be interpreted as a gearing relationship, and a bold line may indicate a camming relationship. In this way, a designer can sketch out design goals on an existing drawing in a manner that can be understood and leveraged by the IDE system 202 to generate code and visualizations. In another example, the project generation component 206 can learn permissives and interlocks (e.g., valves and their associated states) that serve as necessary preconditions for starting a machine based on analysis of the user's CAD drawings. Project generation component 206 can generate any suitable code (ladder logic, function blocks, etc.), device configurations, and visualizations based on analysis of these drawings and markings for incorporation into system project 302. In some embodiments, user interface component 204 can include design tools for developing engineering drawings within the IDE platform itself, and the project generation component 206 can generate this code as a background process as the user is creating the drawings for a new project. In some embodiments, project generation component 206 can also translate state machine drawings to a corresponding programming sequence, yielding at least skeletal code that can be enhanced by the developer with additional programming details as needed.

Also, or in addition, some embodiments of IDE system 202 can support goal-based automated programming. For example, the user interface component 204 can allow the user to specify production goals for an automation system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 206 will generate portions of the system project 302 to satisfy the specified design goals and constraints. Portions of the system project 302 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control coding, or HMI screens suitable for visualizing the automation system being designed.

Some embodiments of the project generation component 206 can also generate at least some of the project code for system project 302 based on knowledge of parts that have been ordered for the project being developed. This can involve accessing the customer's account information maintained by an equipment vendor to identify devices that have been purchased for the project. Based on this information the project generation component 206 can add appropriate automation objects 222 and associated code modules 508 corresponding to the purchased assets, thereby providing a starting point for project development.

Some embodiments of project generation component 206 can also monitor customer-specific design approaches for commonly programmed functions (e.g., pumping applications, batch processes, palletizing operations, etc.) and generate recommendations for design modules (e.g., code modules 508, visualizations 510, etc.) that the user may wish to incorporate into a current design project based on an inference of the designer's goals and learned approaches to achieving the goal. To this end, some embodiments of project generation component 206 can be configured to monitor design input 512 over time and, based on this monitoring, learn correlations between certain design actions (e.g., addition of certain code modules or snippets to design projects, selection of certain visualizations, etc.) and types of industrial assets, industrial sequences, or industrial processes being designed. Project generation component 206 can record these learned correlations and generate recommendations during subsequent project development sessions based on these correlations. For example, if project generation component 206 determines, based on analysis of design input 512, that a designer is currently developing a control project involving a type of industrial equipment that has been programmed and/or visualized in the past in a repeated, predictable manner, the project generation component 206 can instruct user interface component 204 to render recommended development steps or code modules 508 the designer may wish to incorporate into the system project 302 based on how this equipment was configured and/or programmed in the past.

In some embodiments, IDE system 202 can also store and implement guardrail templates 506 that define design guardrails intended to ensure the project's compliance with internal or external design standards. Based on design parameters defined by one or more selected guardrail templates 506, user interface component 204 can provide, as a subset of design feedback 518, dynamic recommendations or other types of feedback designed to guide the developer in a manner that ensures compliance of the system project 302 with internal or external requirements or standards (e.g., certifications such as TUV certification, in-house design standards, industry-specific or vertical-specific design standards, etc.). This feedback 518 can take the form of text-based recommendations (e.g., recommendations to rewrite an indicated portion of control code to comply with a defined programming standard), syntax highlighting, error highlighting, auto-completion of code snippets, or other such formats. In this way, IDE system 202 can customize design feedback 518—including programming recommendations, recommendations of predefined code modules 508 or visualizations 510, error and syntax highlighting, etc.—in accordance with the type of industrial system being developed and any applicable in-house design standards.

Guardrail templates 506 can also be designed to maintain compliance with global best practices applicable to control programming or other aspects of project development. For example, user interface component 204 may generate and render an alert if a developer's control programing is deemed to be too complex as defined by criteria specified by one or more guardrail templates 506. Since different verticals (e.g., automotive, pharmaceutical, oil and gas, food and drug, marine, etc.) must adhere to different standards and certifications, the IDE system 202 can maintain a library of guardrail templates 506 for different internal and external standards and certifications, including customized user-specific guardrail templates 506. These guardrail templates 506 can be classified according to industrial vertical, type of industrial application, plant facility (in the case of custom in-house guardrail templates 506) or other such categories. During development, project generation component 206 can select and apply a subset of guardrail templates 506 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 206 can leverage guardrail templates 506 to implement rules-based programming, whereby programming feedback (a subset of design feedback 518) such as dynamic intelligent autocorrection, type-aheads, or coding suggestions are rendered based on encoded industry expertise and best practices (e.g., identifying inefficiencies in code being developed and recommending appropriate corrections).

Users can also run their own internal guardrail templates 506 against code provided by outside vendors (e.g., OEMs) to ensure that this code complies with in-house programming standards. In such scenarios, vendor-provided code can be submitted to the IDE system 202, and project generation component 206 can analyze this code in view of in-house coding standards specified by one or more custom guardrail templates 506. Based on results of this analysis, user interface component 204 can indicate portions of the vendor-provided code (e.g., using highlights, overlaid text, etc.) that do not conform to the programming standards set forth by the guardrail templates 506, and display suggestions for modifying the code in order to bring the code into compliance. As an alternative or in addition to recommending these modifications, some embodiments of project generation component 206 can be configured to automatically modify the code in accordance with the recommendations to bring the code into conformance.

In making coding suggestions as part of design feedback 518, project generation component 206 can invoke selected code modules 508 stored in a code module database (e.g., on memory 220). These code modules 508 comprise standardized coding segments for controlling common industrial tasks or applications (e.g., palletizing, flow control, web tension control, pick-and-place applications, conveyor control, etc.). In some embodiments, code modules 508 can be categorized according to one or more of an industrial vertical (e.g., automotive, food and drug, oil and gas, textiles, marine, pharmaceutical, etc.), an industrial application, or a type of machine or device to which the code module 508 is applicable. In some embodiments, project generation component 206 can infer a programmer's current programming task or design goal based on programmatic input being provided by a the programmer (as a subset of design input 512), and determine, based on this task or goal, whether one of the pre-defined code modules 508 may be appropriately added to the control program being developed to achieve the inferred task or goal. For example, project generation component 206 may infer, based on analysis of design input 512, that the programmer is currently developing control code for transferring material from a first tank to another tank, and in response, recommend inclusion of a predefined code module 508 comprising standardized or frequently utilized code for controlling the valves, pumps, or other assets necessary to achieve the material transfer.

Customized guardrail templates 506 can also be defined to capture nuances of a customer site that should be taken into consideration in the project design. For example, a guardrail template 506 could record the fact that the automation system being designed will be installed in a region where power outages are common, and will factor this consideration when generating design feedback 518; e.g., by recommending implementation of backup uninterruptable power supplies and suggesting how these should be incorporated, as well as recommending associated programming or control strategies that take these outages into account.

IDE system 202 can also use guardrail templates 506 to guide user selection of equipment or devices for a given design goal; e.g., based on the industrial vertical, type of control application (e.g., sheet metal stamping, die casting, palletization, conveyor control, web tension control, batch processing, etc.), budgetary constraints for the project, physical constraints at the installation site (e.g., available floor, wall or cabinet space; dimensions of the installation space; etc.), equipment already existing at the site, etc. Some or all of these parameters and constraints can be provided as design input 512, and user interface component 204 can render the equipment recommendations as a subset of design feedback 518. In some embodiments, project generation component 206 can also determine whether some or all existing equipment can be repurposed for the new control system being designed. For example, if a new bottling line is to be added to a production area, there may be an opportunity to leverage existing equipment since some bottling lines already exist. The decision as to which devices and equipment can be reused will affect the design of the new control system. Accordingly, some of the design input 512 provided to the IDE system 202 can include specifics of the customer's existing systems within or near the installation site. In some embodiments, project generation component 206 can apply artificial intelligence (AI) or traditional analytic approaches to this information to determine whether existing equipment specified in design in put 512 can be repurposed or leveraged. Based on results of this analysis, project generation component 206 can generate, as design feedback 518, a list of any new equipment that may need to be purchased based on these decisions.

In some embodiments, IDE system 202 can offer design recommendations based on an understanding of the physical environment within which the automation system being designed will be installed. To this end, information regarding the physical environment can be submitted to the IDE system 202 (as part of design input 512) in the form of 2D or 3D images or video of the plant environment. This environmental information can also be obtained from an existing digital twin of the plant, or by analysis of scanned environmental data obtained by a wearable AR appliance in some embodiments. Project generation component 206 can analyze this image, video, or digital twin data to identify physical elements within the installation area (e.g., walls, girders, safety fences, existing machines and devices, etc.) and physical relationships between these elements. This can include ascertaining distances between machines, lengths of piping runs, locations and distances of wiring harnesses or cable trays, etc. Based on results of this analysis, project generation component 206 can add context to schematics generated as part of system project 302, generate recommendations regarding optimal locations for devices or machines (e.g., recommending a minimum separation between power and data cables), or make other refinements to the system project 302. At least some of this design data can be generated based on physics-based rules 516, which can be referenced by project generation component 206 to determine such physical design specifications as minimum safe distances from hazardous equipment (which may also factor into determining suitable locations for installation of safety devices relative to this equipment, given expected human or vehicle reaction times defined by the physics-based rules 516), material selections capable of withstanding expected loads, piping configurations and tuning for a specified flow control application, wiring gauges suitable for an expected electrical load, minimum distances between signal wiring and electromagnetic field (EMF) sources to ensure negligible electrical interference on data signals, or other such design features that are dependent on physical rules.

In an example use case, relative locations of machines and devices specified by physical environment information submitted to the IDE system 202 can be used by the project generation component 206 to generate design data for an industrial safety system. For example, project generation component 206 can analyze distance measurements between safety equipment and hazardous machines and, based on these measurements, determine suitable placements and configurations of safety devices and associated safety controllers that ensure the machine will shut down within a sufficient safety reaction time to prevent injury (e.g., in the event that a person runs through a light curtain).

In some embodiments, project generation component 206 can also analyze photographic or video data of an existing machine to determine inline mechanical properties such as gearing or camming and factor this information into one or more guardrail templates 506 or design recommendations.

Figure 6:
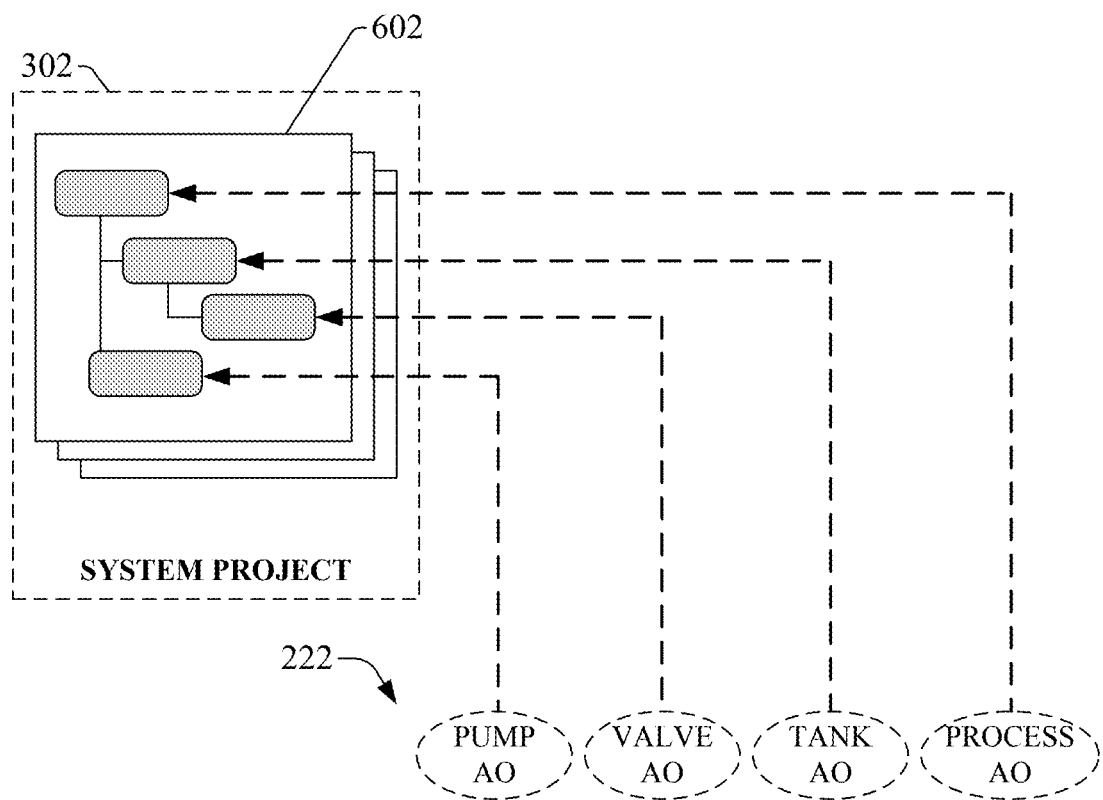
FIG. 6 is a diagram illustrating an example system project that incorporates automation objects into a project model.

As noted above, the system project 302 generated by IDE system 202 for a given automaton system being designed can be built upon an object-based architecture that uses automation objects 222 as building blocks. FIG. 6 is a diagram illustrating an example system project 302 that incorporates automation objects 222 into the project model. In this example, various automation objects 222 representing analogous industrial devices, systems, or assets of an automation system (e.g., a process, tanks, valves, pumps, etc.) have been incorporated into system project 302 as elements of a larger project data model 602. The project data model 602 also defines hierarchical relationships between these automation objects 222. According to an example relationship, a process automation object representing a batch process may be defined as a parent object to a number of child objects representing devices and equipment that carry out the process, such as tanks, pumps, and valves. Each automation object 222 has associated therewith object properties or attributes specific to its corresponding industrial asset (e.g., those discussed above in connection with FIG. 4), including executable control programming for controlling the asset (or for coordinating the actions of the asset with other industrial assets) and visualizations that can be used to render relevant information about the asset during runtime.

At least some of the attributes of each automation object 222 are default properties defined by the IDE system 202 based on encoded industry expertise pertaining to the asset represented by the objects. Other properties can be modified or added by the developer as needed (via design input 512) to customize the object 222 for the particular asset and/or industrial application for which the system projects 302 is being developed. This can include, for example, associating customized control code, HMI screens, AR presentations, or help files associated with selected automation objects 222. In this way, automation objects 222 can be created and augmented as needed during design for consumption or execution by target control devices during runtime.

Figure 7:
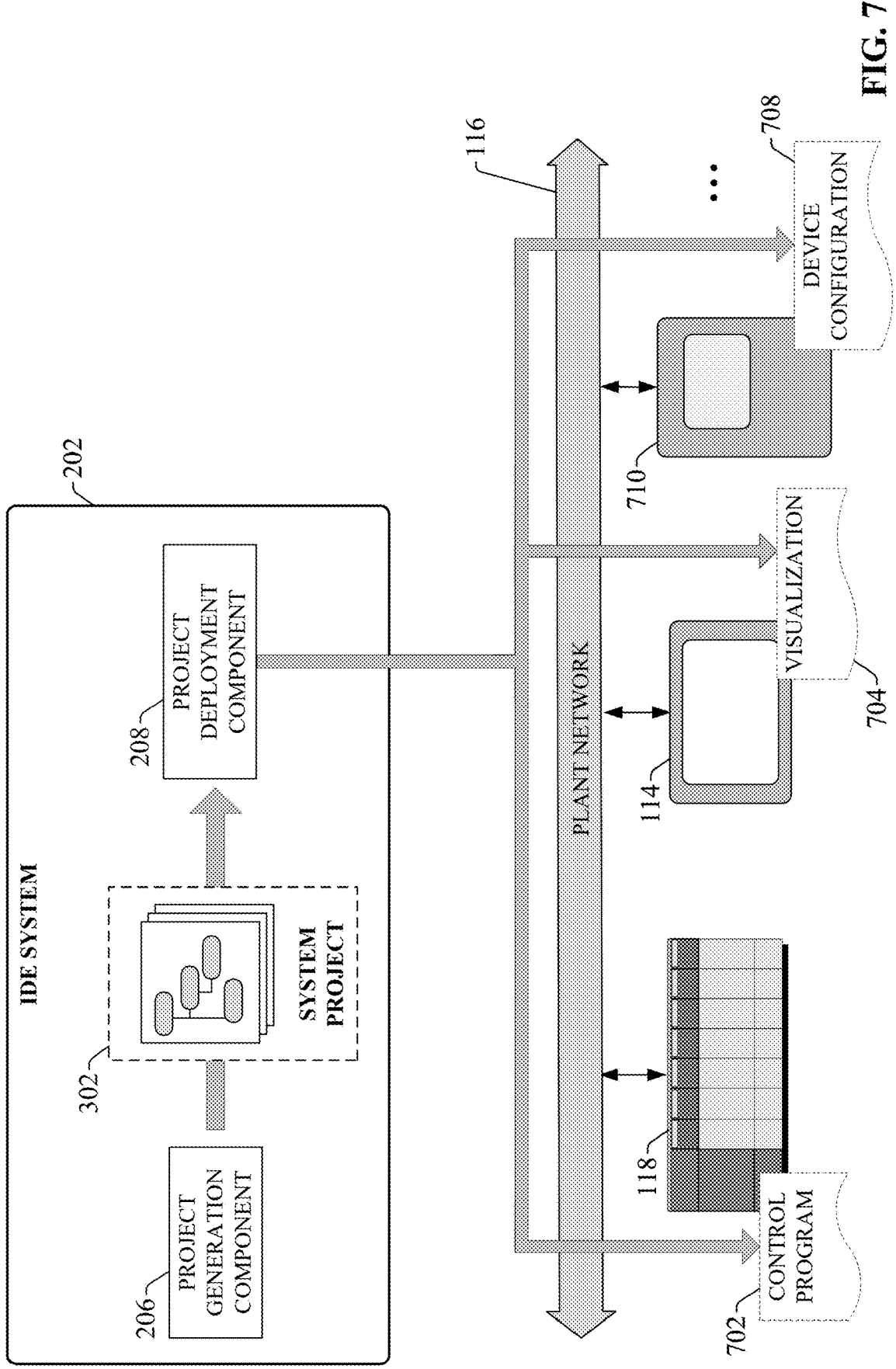
FIG. 7 is a diagram illustrating commissioning of a system project.

Once development on a system project 302 has been completed, commissioning tools supported by the IDE system 202 can simplify the process of commissioning the project in the field. When the system project 302 for a given automation system has been completed, the system project 302 can be deployed to one or more target control devices for execution. FIG. 7 is a diagram illustrating commissioning of a system project 302. Project deployment component 208 can compile or otherwise translate a completed system project 302 into one or more executable files or configuration files that can be stored and executed on respective target industrial devices of the automation system (e.g., industrial controllers 118, HMI terminals 114 or other types of visualization systems, motor drives 710, telemetry devices, vision systems, safety relays, etc.).

Conventional control program development platforms require the developer to specify the type of industrial controller (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDE system 202 can abstract project development from the specific controller type, allowing the designer to develop the system project 302 as a logical representation of the automation system in a manner that is agnostic to where and how the various control aspects of system project 302 will run. Once project development is complete and system project 302 is ready for commissioning, the user can specify (via user interface component 204) target devices on which respective aspects of the system project 302 are to be executed. In response, an allocation engine of the project deployment component 208 will translate aspects of the system project 302 to respective executable files formatted for storage and execution on their respective target devices.

For example, system project 302 may include-among other project aspects-control code, visualization screen definitions, and motor drive parameter definitions. Upon completion of project development, a user can identify which target devices—including an industrial controller 118, an HMI terminal 114, and a motor drive 710—are to execute or receive these respective aspects of the system project 302. Project deployment component 208 can then translate the controller code defined by the system project 302 to a control program file 702 formatted for execution on the specified industrial controller 118 and send this control program file 702 to the controller 118 (e.g., via plant network 116). Similarly, project deployment component 208 can translate the visualization definitions and motor drive parameter definitions to a visualization application 704 and a device configuration file 708, respectively, and deploy these files to their respective target devices for execution and/or device configuration.

In general, project deployment component 208 performs any conversions necessary to allow aspects of system project 302 to execute on the specified devices. Any inherent relationships, handshakes, or data sharing defined in the system project 302 are maintained regardless of how the various elements of the system project 302 are distributed. In this way, embodiments of the IDE system 202 can decouple the project from how and where the project is to be run. This also allows the same system project 302 to be commissioned at different plant facilities having different sets of control equipment. That is, some embodiments of the IDE system 202 can allocate project code to different target devices as a function of the particular devices found on-site. IDE system 202 can also allow some portions of the project file to be commissioned as an emulator or on a cloud-based controller.

As an alternative to having the user specify the target control devices to which the system project 302 is to be deployed, some embodiments of IDE system 202 can actively connect to the plant network 116 and discover available devices, ascertain the control hardware architecture present on the plant floor, infer appropriate target devices for respective executable aspects of system project 302, and deploy the system project 302 to these selected target devices. As part of this commissioning process, IDE system 202 can also connect to remote knowledgebases (e.g., web-based or cloud-based knowledgebases) to determine which discovered devices are out of date or require firmware upgrade to properly execute the system project 302. In this way, the IDE system 202 can serve as a link between device vendors and a customer's plant ecosystem via a trusted connection in the cloud.

Copies of system project 302 can be propagated to multiple plant facilities having varying equipment configurations using smart propagation, whereby the project deployment component 208 intelligently associates project components with the correct industrial asset or control device even if the equipment on-site does not perfectly match the defined target (e.g., if different pump types are found at different sites). For target devices that do not perfectly match the expected asset, project deployment component 208 can calculate the estimated impact of running the system project 302 on non-optimal target equipment and generate warnings or recommendations for mitigating expected deviations from optimal project execution.

Figure 8:
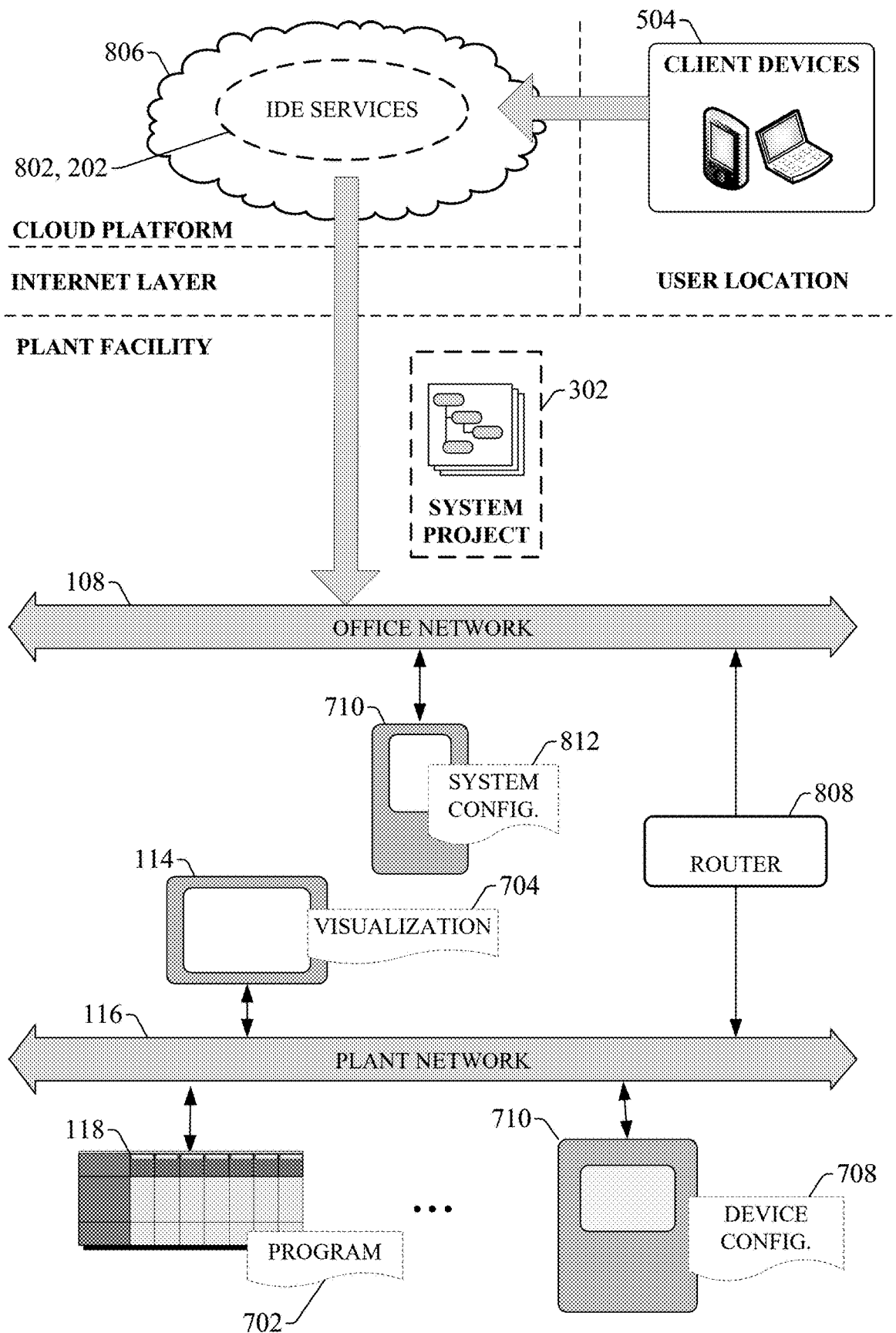
FIG. 8 is a diagram illustrating an example architecture in which cloud-based IDE services are used to develop and deploy industrial applications to a plant environment.

As noted above, some embodiments of IDE system 202 can be embodied on a cloud platform. FIG. 8 is a diagram illustrating an example architecture in which cloud-based IDE services 802 are used to develop and deploy industrial applications to a plant environment. In this example, the industrial environment includes one or more industrial controllers 118, HMI terminals 114, motor drives 710, servers 801 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 810 reside on a separate office network 108 that is connected to the plant network 116 (e.g., through a router 808 or other network infrastructure device).

In this example, IDE system 202 resides on a cloud platform 806 and executes as a set of cloud-based IDE service 802 that are accessible to authorized remote client devices 504. Cloud platform 806 can be any infrastructure that allows shared computing services (such as IDE services 802) to be accessed and utilized by cloud-capable devices. Cloud platform 806 can be a public cloud accessible via the Internet by devices 504 having Internet connectivity and appropriate authorizations to utilize the IDE services 802. In some scenarios, cloud platform 806 can be provided by a cloud provider as a platform-as-a-service (PaaS), and the IDE services 802 can reside and execute on the cloud platform 806 as a cloud-based service. In some such configurations, access to the cloud platform 806 and associated IDE services 802 can be provided to customers as a subscription service by an owner of the IDE services 802. Alternatively, cloud platform 806 can be a private cloud operated internally by the industrial enterprise (the owner of the plant facility). An example private cloud platform can comprise a set of servers hosting the IDE services 802 and residing on a corporate network protected by a firewall.

Cloud-based implementations of IDE system 202 can facilitate collaborative development by multiple remote developers who are authorized to access the IDE services 802. When a system project 302 is ready for deployment, the project 302 can be commissioned to the plant facility via a secure connection between the office network 108 or the plant network 116 and the cloud platform 806. As discussed above, the industrial IDE services 802 can translate system project 302 to one or more appropriate executable files—control program files 702, visualization applications 704, device configuration files 708, system configuration files 812—and deploy these files to the appropriate devices in the plant facility to facilitate implementation of the automation project.

Figure 9:
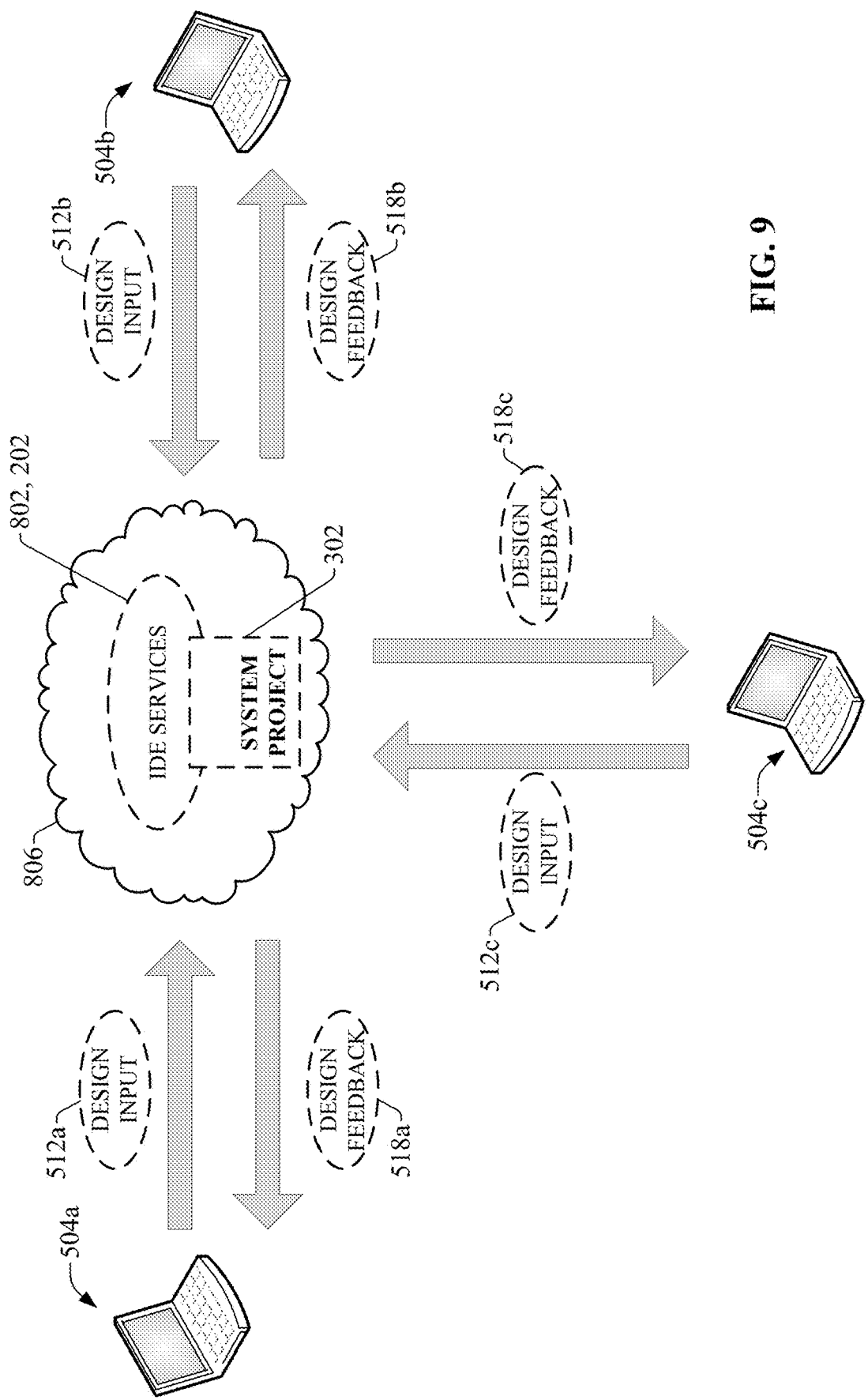
FIG. 9 is a diagram illustrating multi-tenancy of the cloud-based industrial IDE services in which different remote client devices leverage centralized industrial IDE services to individually submit design input directed to a common system project.

As noted above in connection with FIG. 8, some embodiments of IDE system 202 can reside on a cloud platform 806 and execute as a set of cloud-based IDE service 802 that are accessible to authorized remote client devices 504. This allows multiple end users to access and utilize the industrial IDE services 802 for development of industrial system projects 302. FIG. 9 is a diagram illustrating multi-tenancy of the cloud-based industrial IDE services 802 in which different remote client devices 504a-504c leverage the centralized industrial IDE services 802 to individually submit design input 512 directed to a common system project 302. Using this architecture, multiple remote developers can submit design input 512 to a common industrial automation system project 302, facilitating parallel development by multiple remote designers. The industrial IDE system 202 can support collaborative design tools that manage and regulate these diverse sets of design input 512 to ensure consistency and optimization of the system project 302.

In this example, the industrial IDE services 802 are made accessible to multiple authorized clients (associated with respective client devices 504a-504c) in a secure manner. Using respective design interfaces served to the client devices 504a-504c by the IDE services 802, developers at each client device can interface with the IDE services 802 to submit design input 512a-512c directed to a common industrial system project. As discussed above, IDE services 802 will generate and render individual design feedback 518a-518c to each user's client device 504a-504c as each user proceeds through their project development workflow. System project 302 is securely stored on the cloud platform 806 during development, and upon completion can be deployed to from the cloud platform 806 to the automation system devices that make up the automation system from the cloud platform (as depicted in FIG. 8) or can be downloaded to a client device for localize deployment from the client device to one or more industrial devices. Since IDE services 802 reside on a cloud-platform with access to internet-based resources, some embodiments of the IDE services 802 can also allow users to access remote web-based knowledge-bases, vendor equipment catalogs, or other sources of information that may assist in developing their industrial control projects.

Cloud-based IDE services 802 can support true multi-tenancy across the layers of authentication authorization, data segregation at the logical level, and network segregation at the logical level. End users can access the industrial IDE services 802 on the cloud platform 806, and each end user's development data—including design input 512, design feedback 518, and system projects 302—is encrypted such that each end user can only view data associated with their own industrial enterprise. In an example implementation, an administrator of the cloud-based industrial IDE services 802 may maintain a master virtual private cloud (VPC) with appropriate security features, and each industrial enterprise can be allocated a portion of this VPC for their own developer's access to the IDE services 802. In an example embodiment, an encrypted multi-protocol label switching (MPLS) channel can protect the entire corpus of an end user's data such that the data can only be viewed by specific computers or domains that have an appropriate certificate.

Figure 10:
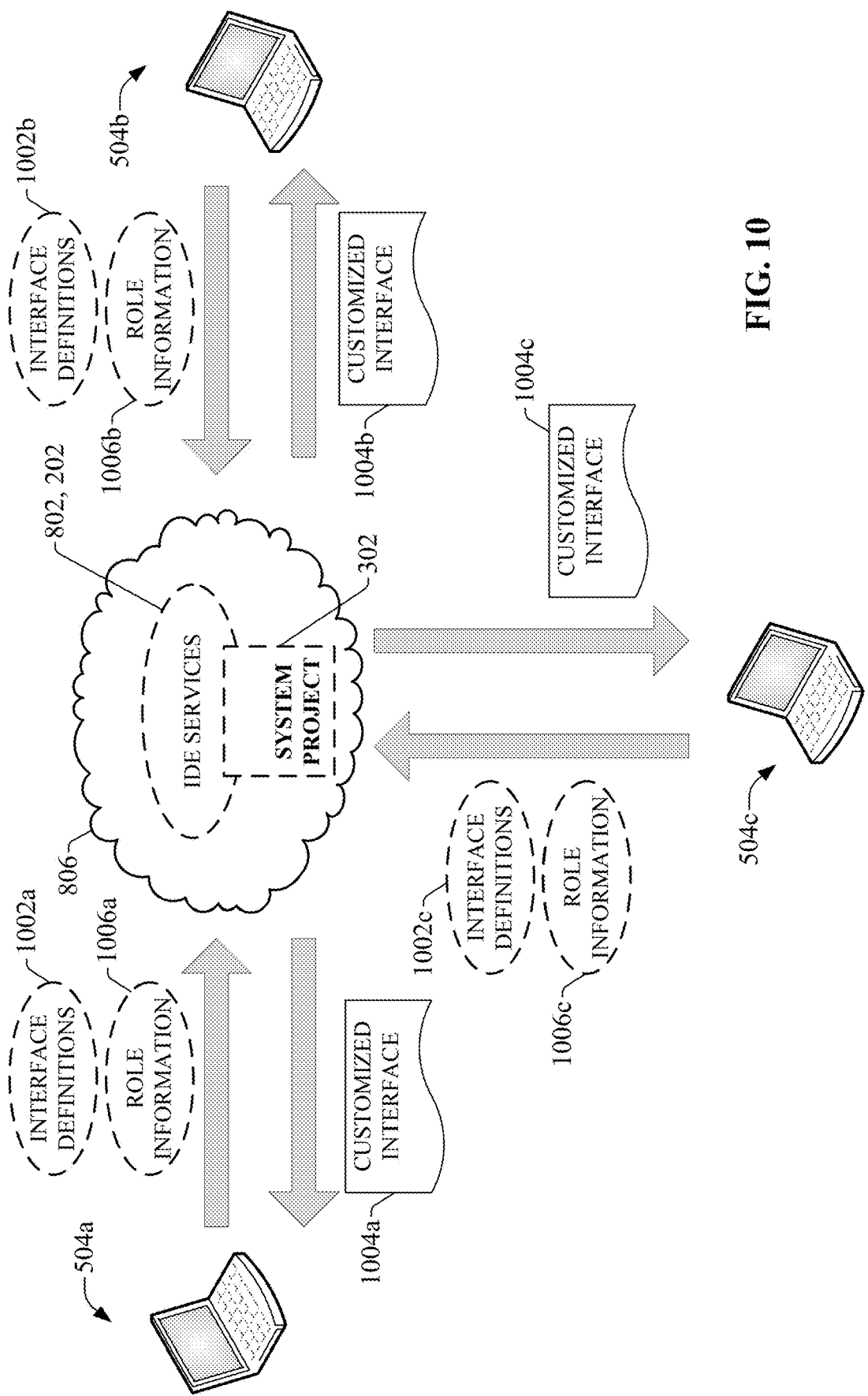
FIG. 10 is a diagram illustrating multi-tenancy of cloud-based industrial IDE services in which respective client devices are permitted to separately customize their own development environment interfaces.

In some embodiments, IDE services 802 can permit different collaborative developers working on the same system project 302 to independently customize their version of the development platform interface as desired, and to interface with the master copy of the system project 302 with their own customized development interfaces. FIG. 10 is a diagram illustrating multi-tenancy of the cloud-based industrial IDE services 802 in which each client device 504 is permitted to separately customize their own development environment interfaces 1004a-1004c. In this example architecture, each client device 504a-504c can separately submit interface definition data 1002a-1002c to thereby separately configure their own customized development platform interfaces 1004a-1004c and preferred forms of dynamic design feedback.

Also, in some embodiments, the look and available functionality offered by a given instance of a development platform interface 1004 may be a function of a role the developer accessing the IDE services 802, as determined by role or user identity information 1006 submitted by the developer. In such embodiments, the subset of available IDE functionality to be made available to a given developer role may be defined by user role definitions stored on the IDE system 202. The user interface component 203 and IDE editor 224 can access these user role definitions in view of the role and/or user identity information 1006 submitted by a developer to determine how that developer's customized interface 1004 should be customized. In an example scenario, a developer having a lead developer role may be granted a broader set of development features—e.g., design override privileges, the ability to track design contributions of individual developers, etc.—relative to developers having subsidiary roles. In another example, the set of guardrail templates 506 applied within a given user's customized interface 1004 may be a function of the user's role, such that design modifications permitted to be submitted by the user is regulated by predefined guardrail templates 506 appropriate to the developer's role.

Figure 11:
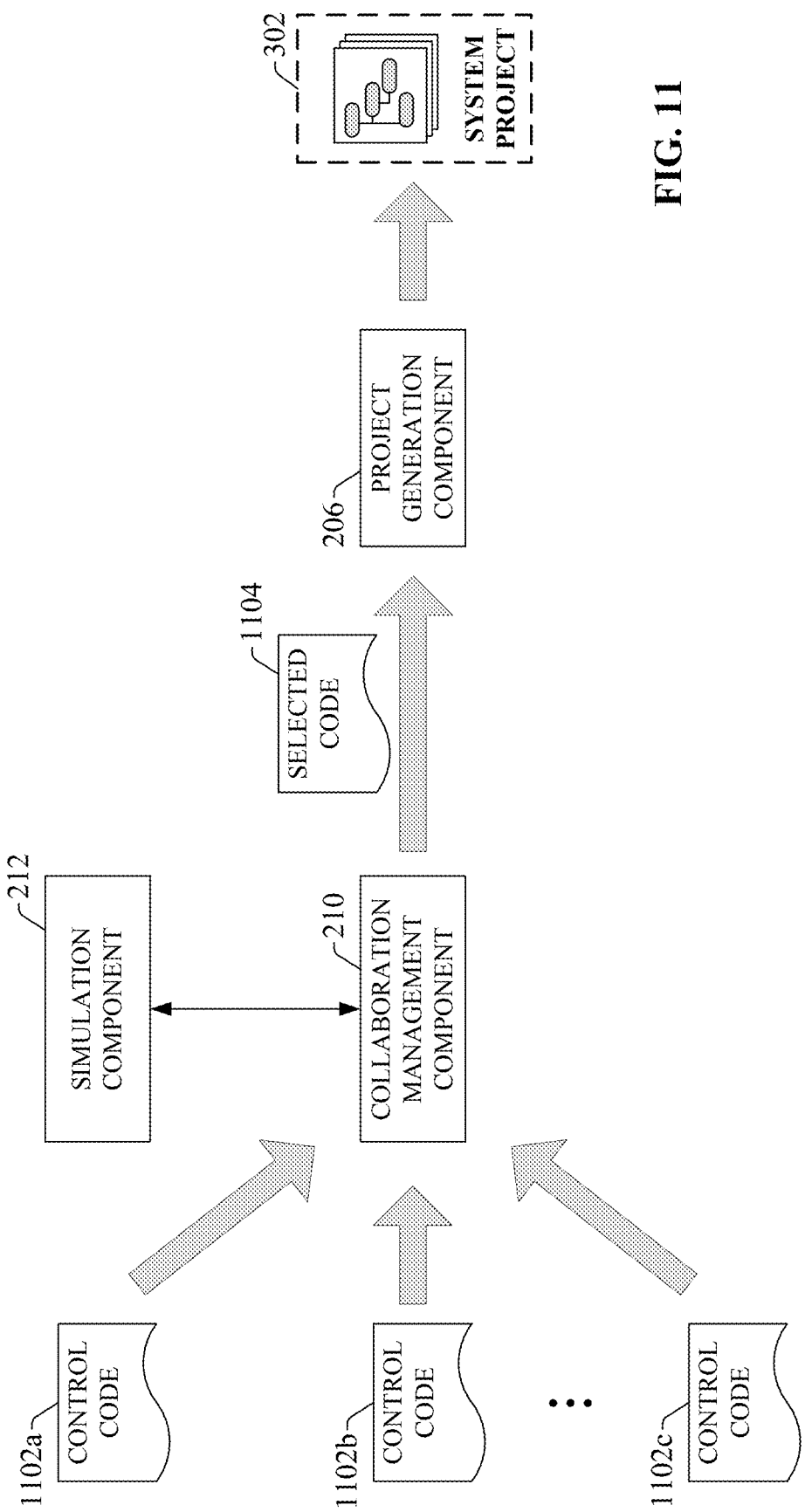
FIG. 11 is a diagram illustrating mediation or brokering between different sets of design input directed to the same aspect of a system project.

Collaborative tools supported by the IDE system 202 can manage design contributions from the multiple collaborative developers and perform version control of the aggregate system project 302 to ensure project consistency. In the context of this collaborative design environment, in which different individuals or groups perform parallel development on a common system project 302, there may be scenarios in which multiple developers submit design input 512 (e.g., control programming, visualization application development, device configuration settings, etc.) directed to the same portion of the system project 302. FIG. 11 is a diagram illustrating mediation or brokering between different sets of design input directed to the same aspect of a system project 302 according to some embodiments. In this example, multiple project developers working on development of a system project 302 for an industrial automation system have submitted, as part of design input 512, respective different, mutually exclusive versions of control code 1102a-1102c to be included in the system project 302. These versions of the control code 1102 may be, for example, alternative versions of a particular control routine, custom automation object, or another aspect of the system project 302.

The IDE system's collaboration management component 210 can compare control code 1102 submitted by multiple parties for the same code block and select one of the alternative sets of control code 1102 for integration into the project. In this regard, collaboration management component 210 can apply any suitable criterion to select the preferred version of the control code 1102. For example, in some embodiments collaboration management component 210 can select the version of the control code 1102 that performs the same control function with the least lines of code. In another example, collaboration management component 210 may select the version of the code that is estimated to control its associated mechanical asset with the least stress on the machinery. In this case, estimations of the amount of stress applied to the controlled industrial assets can be determined by the collaboration management component 210 based on an analysis of the respective versions of the control code 1102 in view of built-in industrial expertise regarding how the respective control sequences will affect the mechanical assets.

For example, collaboration management component 210 may analyze each version of the control code 1102 to determine an estimated machine cycle frequency that will result from execution of each version of the control code 1102. Since higher frequencies correlate to faster machine wear, collaboration management component 210 may select the version of the control code 1102 that is estimated to perform the control function with a smallest machine cycle frequency without causing the product throughput to fall below a defined minimum. In another example, collaboration management component 210 may estimate expected ranges of motion of a mechanical asset (e.g., a motion device) that will be implemented by each version of the control code 1102, or a number of individual mechanical motions that will be implemented by the respective versions of the control code 1102 to perform the same function, and select the version of the control code that is expected to implement the control function using the shortest motions or least number of motions. Other types of predictive control analysis and corresponding version selection criteria are within the scope of one or more embodiments. Based on results of such analyses, collaboration management component 210 can select one of the versions of the control code 1102 as being a most suitable version, and project generation component 206 will integrate this selected version of the code 1104 into the system project 302.

Figure 12:
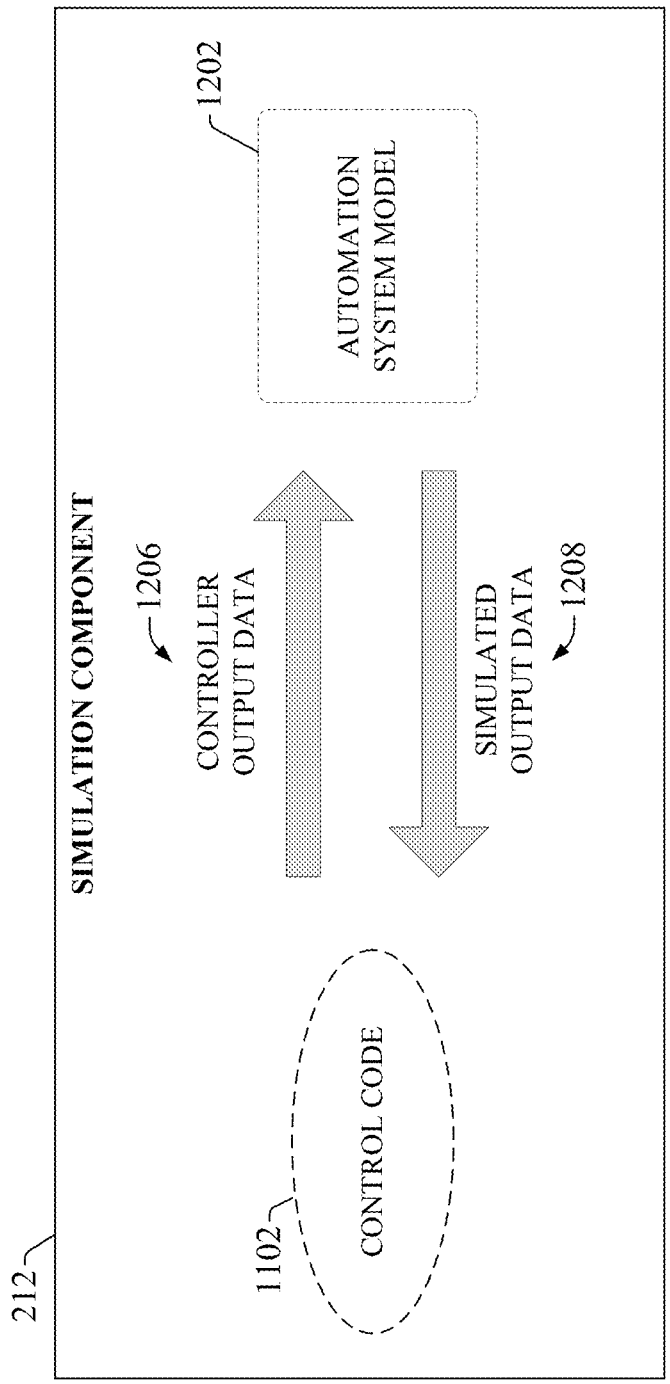
FIG. 12 is a diagram illustrating interactions between a version of control code being tested and an automation system model.

In some embodiments, collaboration management component 210 can leverage a simulation component 212 in connection with assessing the respective different versions of the control code 1102. Simulation component 212 can be configured to simulate control of an automation system (or a portion thereof) by the respective versions of the control code 1102 and provide results of the simulations to the collaboration management component 210, which selects the preferred version of the code 1104 based on these results. Any of the example types of assessment analyses described above may be performed using control simulations carried out by the simulation component 212. In some embodiments, simulation component 212 can leverage a digital model of the automation system for which system project 302 is being developed in connection with simulating the different versions of the control code 1102. FIG. 12 is a diagram illustrating interactions between a version of control code 1102 being tested and an automation system model 1202. In this example, the IDE system's simulation component 212 acts as an industrial controller emulator to execute control code 1102 (or control code portion) against automation system model 1202.

Automation system model 1202 can simulate various aspects of the physical industrial automation system to be monitored and regulated by the system project 302. Simulation component 212 can virtually interface control code 1102 with the automation system model 1202 to exchange virtual I/O data in order to simulate real-world control. Automation system model 1202 mathematically models the system to be regulated by generating digital and analog I/O values representing, for example, sensor outputs, metering outputs, or other plant data analogous to the data expected to be generated by the physical system being modeled. These inputs and outputs can be defined for each industrial asset by the model 1202.

Simulation component 212 provides this simulated output data 1208 to the control code 1102, which receives this data as one or more virtual physical inputs. Control code 1102 processes these inputs according to the developer's control programming and generates digital and/or analog controller output data 1206 based on the processing. This output data 1206 represents the physical outputs that would be generated by a controller executing control code 1102 and transmitted to the hardwired field devices comprising the automation system (e.g., PID loop control outputs, solenoid energizing outputs, motor control outputs, etc.). The controller output data 1206 is provided to the appropriate input points of the automation system model 1202, which updates the simulated output data 1208 accordingly.

Simulation component 212 can be configured to execute and monitor this simulation and to quantify one or more performance criteria based on results of the simulation that will be used by the collaboration management component 210 to select a preferred version of the control code 1102 for inclusion in system project 302. These performance criteria can include, for example, an amount of wear on the controlled mechanical equipment, an amount of energy consumed as a result of controlling the automation system using the control code 1102, an amount of product throughput as a result of controlling the automation system using the control code 1102, an amount of maintenance required, or other such criteria.

In some embodiments, if two or more of the different versions of control code 1102 are not necessarily mutually exclusive but overlap in some areas, collaboration management component 210 can manage comparing and merging the two or more versions within the master copy of the system project 302. This can include, for example, identifying and deleting redundant or identical code portions of the two or more versions, identifying competing versions of the same portion of control code and selecting a preferred version for inclusion in the system project 302, identifying conflicting control actions defined by two or more versions and either recommending a modification to resolve the conflict or automatically implementing the modification, or other such actions.

Although FIGS. 11 and 12 depicts the alternative design input as being control code 1102, collaboration management component 210 (with or without the assistance of simulation component 212) can also mediate or broker between other types of project elements, including but not limited to visualization aspects (e.g., HMI screens, AR/VR objects, etc.), device parameter settings, engineering drawings, etc.

Also, some embodiments of simulation component 212 can be configured to perform a risk analysis of a proposed update to the system project 302 submitted via a developer's design input 512. For example, in response to receipt of an update or revision to a portion of a control program included in the system project 302, simulation component 212 can initiate a risk analysis of the proposed update to determine possible ramifications of the update. As part of this risk assessment, simulation component 212 may perform a regression analysis on the system project 302 as a whole to determine which other aspects of the system project are likely to be affected by the proposed modification, and use simulation techniques or other types of analysis to determine how the update will affect performance of these other related aspects. Based on results of this analysis, the user interface component 204 may generate a message on the developer's interface 1004 warning of possible impacts of the modification on other portions of the system project 302, and prompt the user to acknowledge the warning prior to implementing the change into the system project 302.

Figure 13:
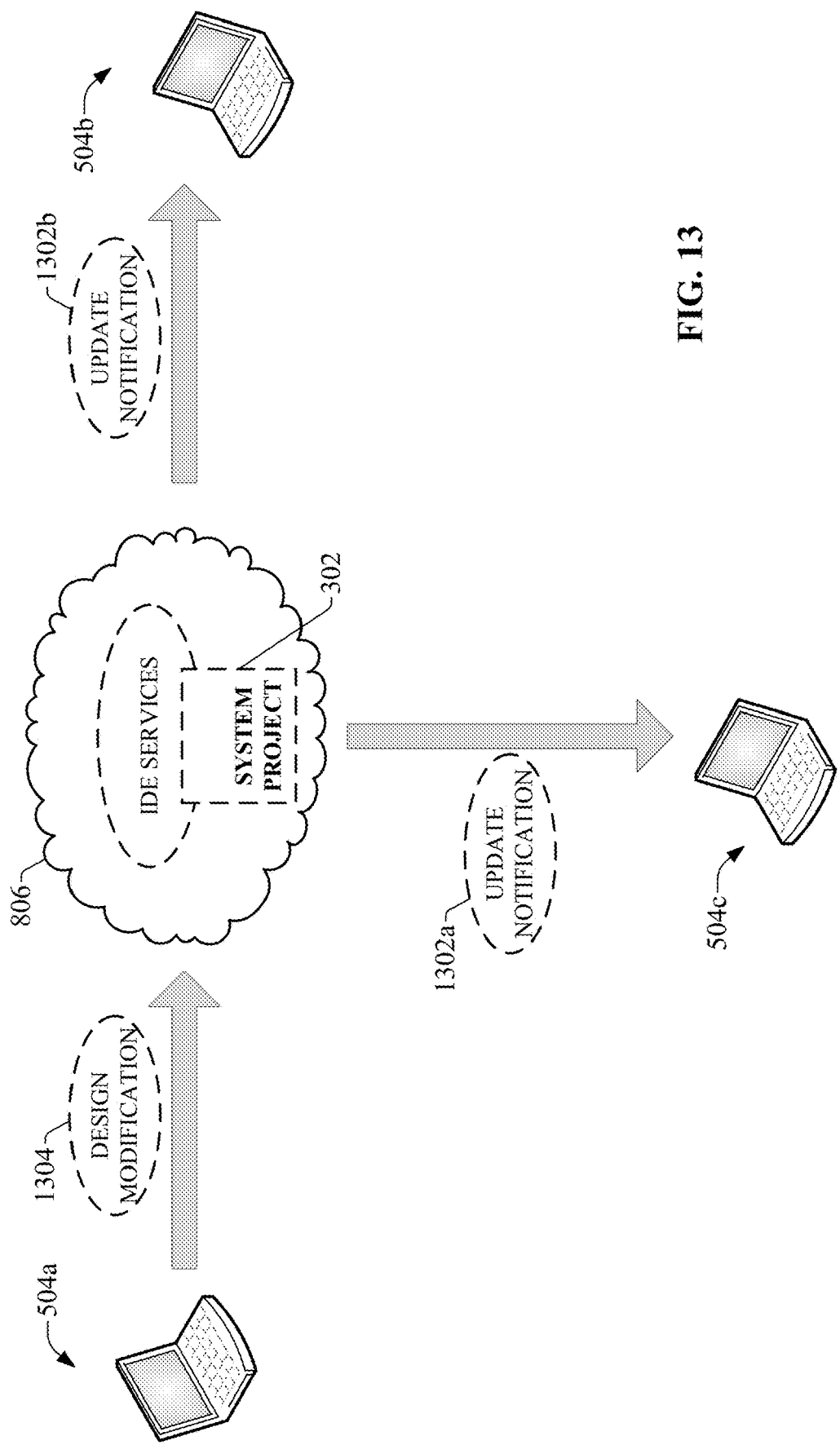
FIG. 13 is a diagram illustrating distribution of update notifications to selected developers in response to receipt of a proposed design modification from another developer.

In some embodiments in which different developers are working on respective different portions of the system project 302, the user interface component 204 may also send warnings to selected other developers whose portions of the system project 302 are determined to be affected by the initiating developer's proposed update. FIG. 13 is a diagram illustrating distribution of update notifications 1302 to selected developers in response to receipt of a proposed design modification 1304 from another developer (the developer associated with client devices 504a in the illustrated example). As described above, submission of a design modification 1304 by a developer directed to a portion of the system project 302 can initiate a regression analysis on the system project 302 to identify other portions of the system project 302 that may be affected by the modification 1304. In various embodiments, collaboration management component 210 can identify the affected portions of the system project 302 based on learned interdependencies across the system project, including but not limited to programmatic relationships or dependencies between control code segments or routines, dependencies between control code segments and visualization elements, dependencies between control code and engineering drawings (e.g., I/O drawings, electrical drawings, panel layout drawings, etc.), or other such relationships. Collaboration management component 210 can also identify hierarchical relationships between automation objects and/or control code routines or modules defined by the project data model 602.

Based on these learned interdependencies, collaboration management component 210 can identify the portion of the system project 302 to which the design modification 1304 is directed, and further identify other portions of the system project 302 whose functions or responses may be affected by the design modifications. In embodiments in which different developers or groups of developers have been assigned to work on respective different portions or aspects of the system project 302, collaboration management component 210 can also identify the developers or groups who have been assigned to the affected portions of the system project 302, and user interface component 204 can send update notifications 1302 to the development interfaces 1004 associated with these affected portions (e.g., interfaces associated with client devices 504b and 504c in the illustrated example). These update notifications 1302 can include descriptions of the proposed modification 1304, an indication of a possible impact on the recipient's portion of the system project 302, or other such information. In some embodiments, collaboration management component 210 may be configured to integrate the proposed design modification 1304 into the system project 302 only if all notification recipients submit an approval for the design modification, based on their own determinations that the proposed modification will not adversely affect their portions of the system project 302.

In some embodiments, collaboration management component 210 can also be configured to track and record each developer's design contributions to the system project 302. This information can be used for auditing purposes, to track developer productivity, to identify originators of specific design contributions, or for other purposes.

Collaboration management component 210 can also be configured to share development notes submitted by the various developers via user interface component 204. These development notes can be submitted as part of the design input 512 and attached to specified portions of the system project 302 (e.g., a control code segment, a device configuration parameter setting, an engineering drawing element, etc.), such that when other developers view a portion of the system project 302 to which another developer has attached a development note, the development note can be selectively viewed. In some embodiments, elements of the system project 302 to which a development note has been attached can be represented as a selectable icon located on or near the corresponding project element, and selection of the icon can render the note for viewing.

Figure 14:
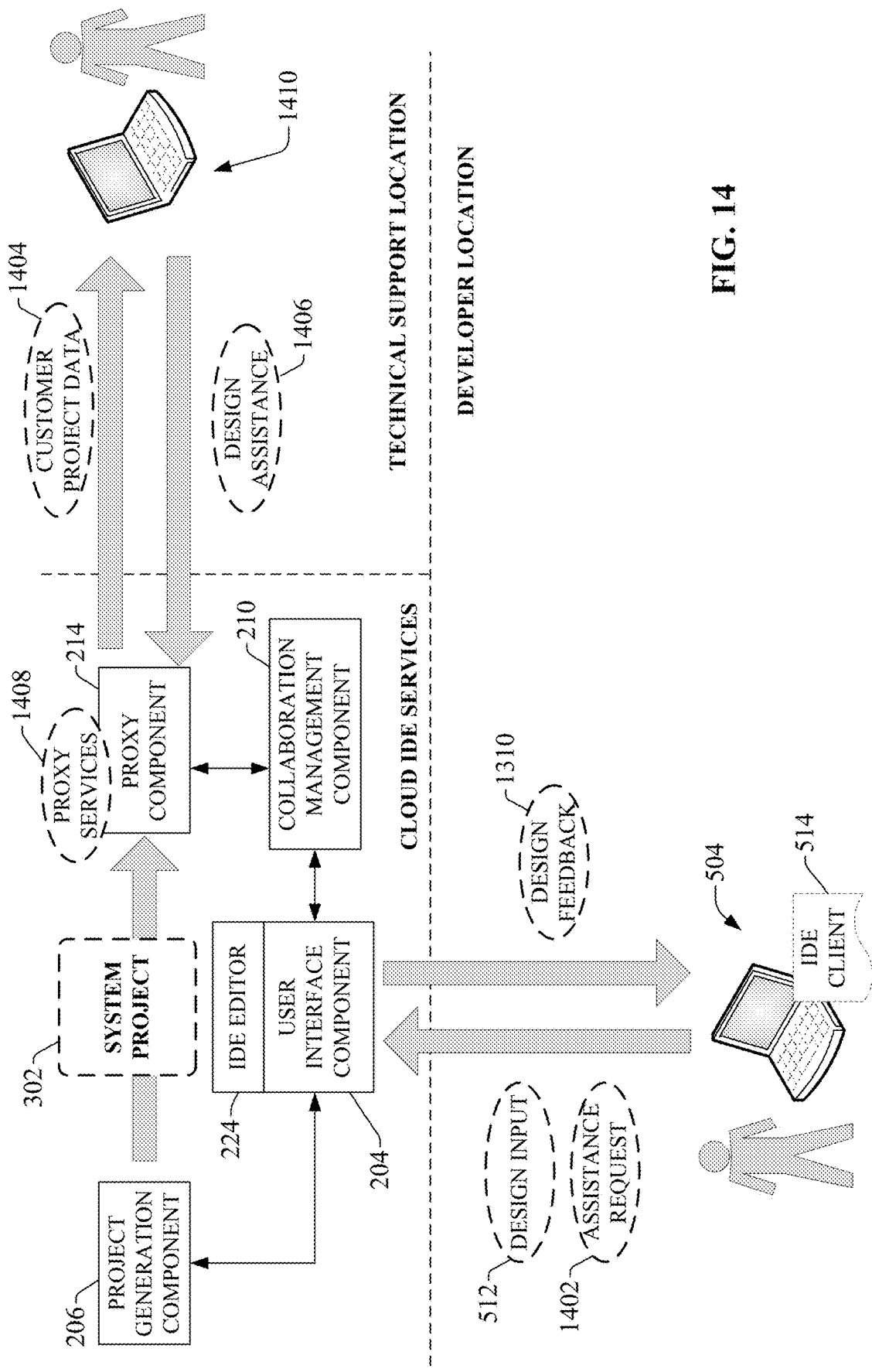
FIG. 14 is a diagram illustrating the use of IDE services as a proxy between a plant-based project developer and remote technical support personnel.

In some embodiments, the collaborative editing environment supported by the industrial IDE system can also encompass access to project development experts in real-time during design. FIG. 14 is a diagram illustrating the use of IDE services as a proxy between a plant-based project developer and remote technical support personnel. In this embodiment, industrial IDE services 802 include associated proxy services 1308 (implemented by proxy component 214) that manage connectivity and data exchange between a developer's client device 504 and remote technical support. In cloud-based implementations, each end user's system project 302 (e.g., a completed system project 302 for an automation system currently in operation or a pending system project 302 in development for an automation system to be commissioned) is securely maintained on the cloud platform. Proxy services 1308 can permit authorized technical support personnel (associated with client device 1310) to access some or all of a given customer's system project data using the IDE services 802 to proxy into the customer's data. The technical support entity may be, for example, an administrator of the IDE services 802, an OEM who manufactures a machine for which control programming is being developed, a system integrator, an equipment vendor, or another such entity. In some embodiments, the end user can selectively permit access to a selected subset of their system project data, while prohibiting access to other portions of their system project 302 from the technical support personnel, thereby protecting sensitive or proprietary project information.

In an example scenario, project generation component 206 can infer, based on analysis of design input 512 and the system project 302 as a whole, the designer's current design goal (e.g., programming a particular automation function, setting configuration parameter values for a particular type of industrial device in connection with performing an automation function, etc.). Based on this inference of the user's design intentions, collaboration management component 210 can initiate—via proxy component 214—a communication channel to a live or automated expert capable of assisting with the design goal.

In some embodiments, the IDE system 202 can establish connectivity with the expert automatically in response to an inference that the developer is experiencing difficulty in developing a portion of the system project 302 relating to the design goal. Alternatively, the IDE development interface can include controls that allow the end user to submit an assistance request 1402 that initiates collaboration with the expert. The assistance request 1402 may specify a particular aspect of the system project 302 for which assistance is required (e.g., a control code routine, a visualization screen, device selection or compatibility, configuration of a specified industrial device, etc.). In some embodiments, proxy component 214 may perform additional processing on the assistance request 1402 prior to sending a request to a remote support representative. Proxy component 214 can perform this additional processing based in part on previously captured knowledge of the end user's automation system in development, or the customer's larger plant facility. For example, proxy component 214 can glean additional customer-specific context that may assist in solving the design problem for which assistance is being requested.

Such context may include additional information about the devices and/or machines that make up the automation system for which the system project 302 is being developed (e.g., identities of such devices, as well as their role in the overall industrial system and their functional relationships to one another), other upstream or downstream processes relative to the automation system being designed, whose operations may have an impact on operation of the new automation system, etc. In response to receipt of the assistance request 1402, proxy component 214 can select an available technical support person determined to be qualified to assist with the request—e.g., based on information stored in competency profiles for respective technical support people indicating each person's level of training, areas of expertise, equipment for which the person has experience, etc.—and open a remote communication channel to the selected technical support person.

Once this communication channel is established, the technical support person can access, view, and modify selected subsets of customer project data 1404 (via customer support client device 1410) obtained from the system project 302. In some embodiments, user interface component 204 can present the expert with a visualization of the designer's code, visualization application development screens, device configuration parameters, or other aspects of system project 302. The technical support person can submit design assistance 1306 in the form of direct modifications to aspects of the end user's system project 302 (e.g., control code rewrites, setting of device configurations, etc.) or design feedback 1312 submitted to the end user recommending certain modifications or otherwise providing design guidance. In some embodiments, the cloud-based IDE system 202 can also serve as a trusted proxy through which technical support personnel can remotely access equipment at the end user's plant facility; e.g., for the purposes of remotely configuring the user's devices, viewing or modifying control programming on an industrial controller or visualization screens on an HMI terminal, etc.

Some embodiments of IDE system 202 can support submission of design input 512 via a virtualized development environment served to a wearable appliance by the user interface component 204. This virtual development environment allows an automation system designer to submit design input 512 via interaction with a virtual reality presentation of the plant facility (e.g., the installation site at which the automation system will be installed). Using this approach, the IDE system 202 can generate portions of the system project 302—including but not limited to device selections, industrial control programming, device configurations, visualizations, engineering drawings, etc.—based on the developer's manual interactions with the virtual reality presentation. These interactions can include, for example, manual gestures that simulate placing and moving machines or other industrial assets within the virtualized environment, defining trajectories of motion devices or robots using manual gestures, or other such interactive input. The project generation component can interpret the developer's interactions and gestures as design specifications for the automation system being designed and translates these interactions into control code, visualizations, device configurations, and other executable system components that satisfy the design specifications.

Figure 15:
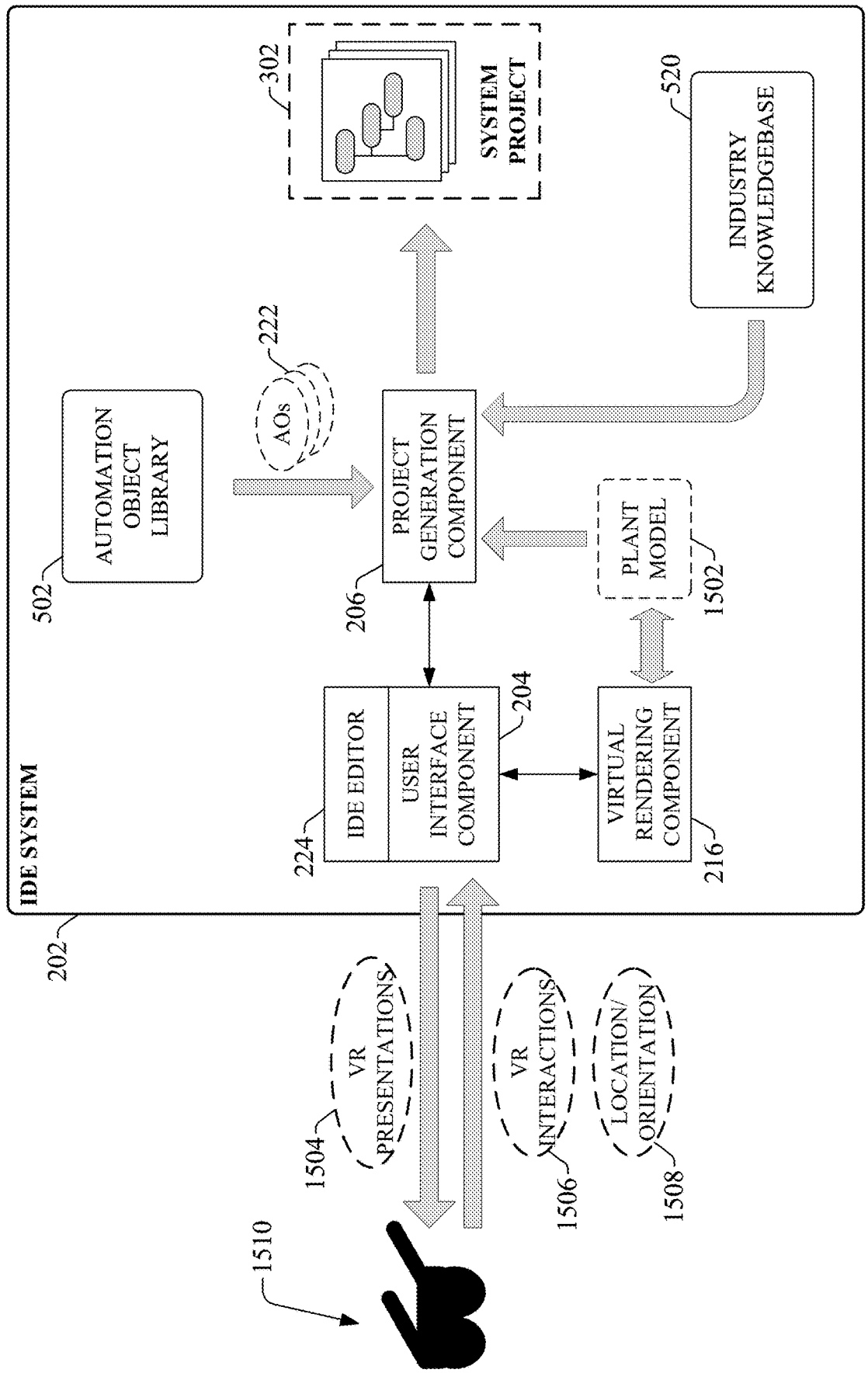
FIG. 15 is a diagram illustrating example data flows associated with creation of a system project for an automation system based on a user's interactions with a VR presentation of a plant.

FIG. 15 is a diagram illustrating example data flows associated with creation of a system project 302 for an automation system based on a user's interactions with a VR presentation of a plant according to one or more embodiments. In this example, a wearable AR/VR appliance 1510 can interface with industrial IDE system 202 via user interface component 204, which may comprise a wired or wireless network interface, a near-field communication interface, or other such device interface suitable for the particular platform on which the IDE system 202 is implemented. In some embodiments, user interface component 204 may be configured to verify an authorization of the wearable appliance 1510 to access the IDE system 202 prior to allowing VR presentations to be delivered to the wearable appliance 1510. User interface component 204 may authenticate the wearable appliance 1510 or its owner using password verification, biometric identification (e.g., retinal scan information collected from the user by the wearable appliance 1510 and submitted to the user interface component 204), cross-referencing an identifier of the wearable appliance 1510 with a set of known authorized devices, or other such verification techniques.

In this embodiment, user interface component 204 has an associated virtual rendering component 216 configured to generate virtual reality presentation data 1504 to wearable appliance 1510 for delivery by user interface component 204. Presentation data 1504, when received and executed by wearable appliance 1510, renders an interactive three-dimensional (3D) virtual reality presentation of an industrial area on the wearable appliance's display. To facilitate generating a virtual representation of an industrial area (e.g., a portion of an industrial facility in which the automation system being designed is to be installed or modified), IDE system 202 can maintain one or more plant models 1502 that define a visual representation of the physical layout of the area represented by the VR presentation data 1504. For example, a plant model 1502 for a given industrial area (e.g., a production area, a workcell, an assembly line, etc.) can define graphical representations of the industrial assets—including machines, conveyors, control cabinets, and/or industrial devices—located within that area, as well as the physical relationships between these industrial assets. For each industrial asset, the plant model 1502 can define physical dimensions and colors for the asset, as well as any animation supported by the graphical representation (e.g., color change animations, position animations that reflect movement of the asset, etc.). The plant models 1502 also define the physical relationships between the industrial assets, including relative positions and orientations of the assets on the plant floor, conduit or plumbing that runs between the assets, and other physical definitions.

In some embodiments, the plant model 1502 may be a digital twin of an existing plant or may be generated based in part of such a digital twin. Also, in some embodiments, at least a portion of plant model 1502 may be generated based on environmental properties of an installation area extracted from video or image data. In such embodiments, information regarding industrial assets, physical obstacles, distances, locations, or other environmental features discovered based on analysis of video or image data can be fed to the plant model 1502 so that these environmental features are represented in the model 1502.

A rendering engine supported by virtual rendering component 216 is configured to generate an interactive VR presentation of the industrial area based on the industrial asset rendering definitions specified in the plant model 1502. User interface component 204 delivers the resulting VR presentation to wearable appliance 1510 as VR presentation data 1504.

Figure 16A:
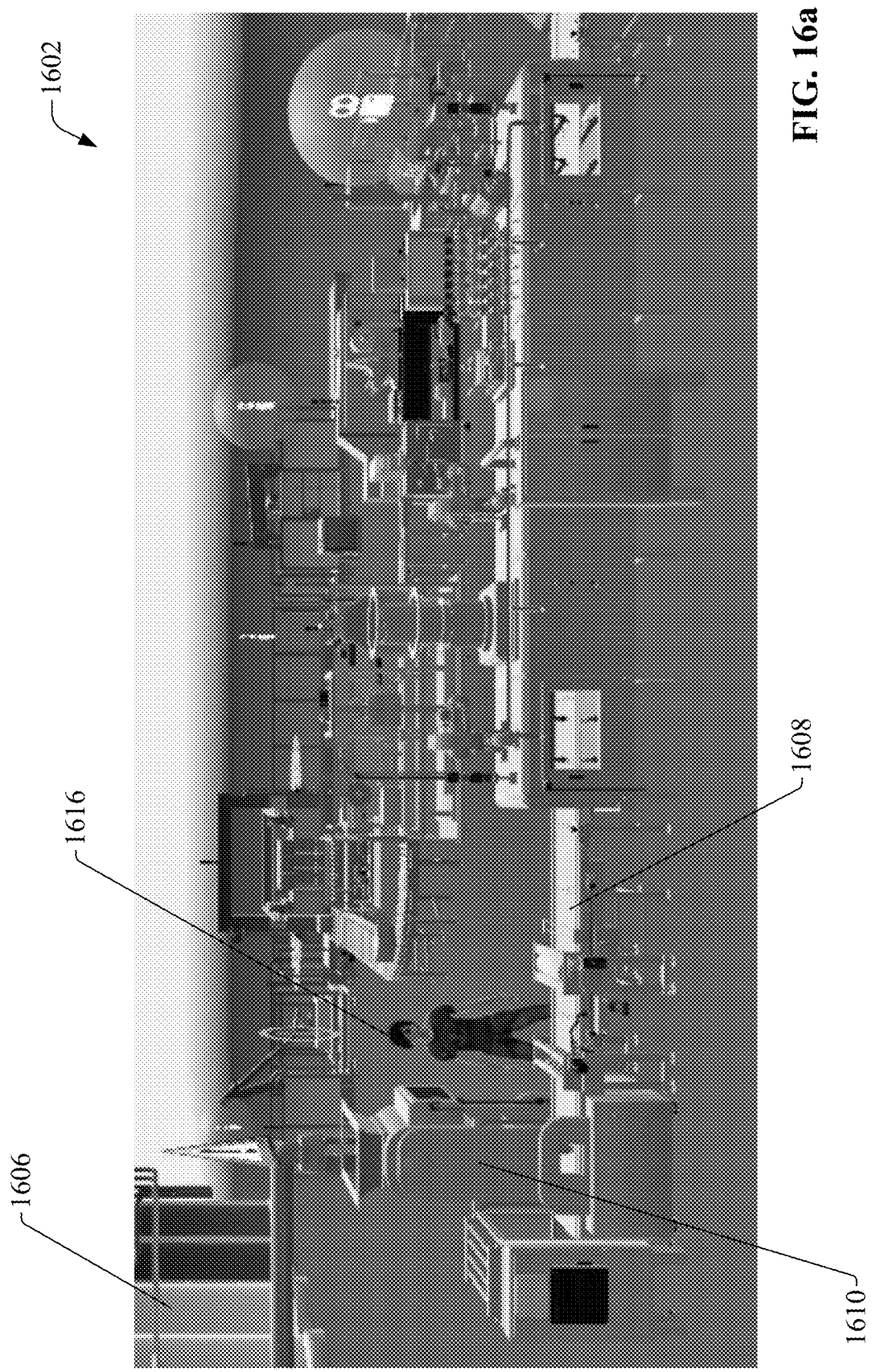
FIG. 16a is a partial rendition of an example virtual reality presentation depicting a first-person perspective of an industrial area, which can be generated by a virtual rendering component of an industrial IDE system.
Figure 16B:
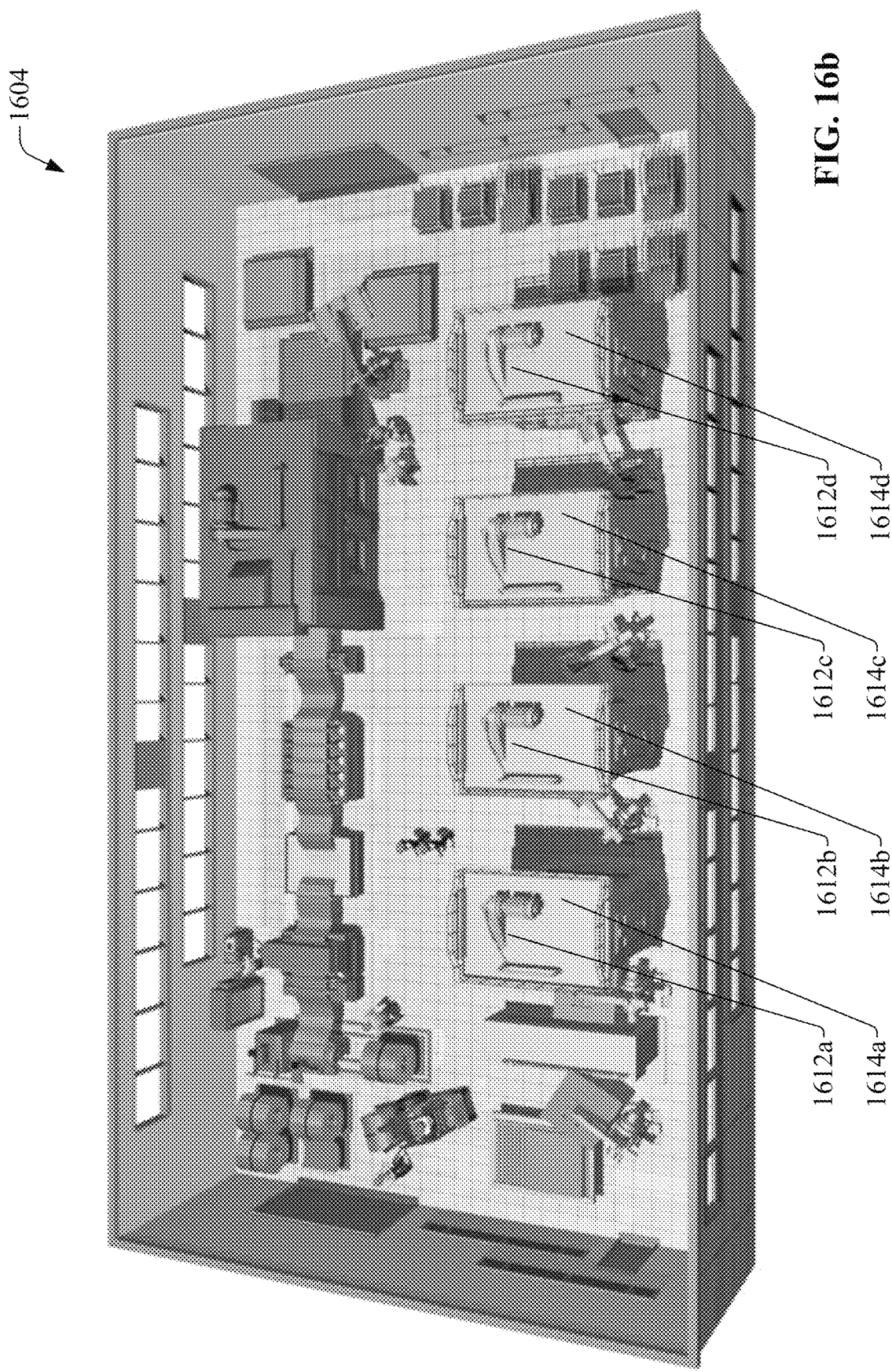
FIG. 16b is a rendition of another example virtual reality presentation depicting an external perspective of an industrial area, which can also be generated by the virtual rendering component.

FIG. 16a is a partial rendition of an example virtual reality presentation 1602 depicting a first-person perspective of an industrial area, which can be generated by virtual rendering component 210. FIG. 16*b* is a rendition of another example virtual reality presentation 1604 depicting an external perspective of an industrial area, which can also be generated by virtual rendering component 210. It is to be appreciated that, due to the constraints inherent in presenting virtual reality presentations via two-dimensional drawings, the example VR presentation illustrated in FIGS. 11*a*-11*b* cannot fully depict the VR presentations that are rendered on suitable wearable appliances. In general, the VR presentations rendered by wearable appliances 1510 provide surrounded virtual renderings encompass the user's entire field of view, and transition their line of sight or perspective as the user's location and orientation change. The partial renditions and associated descriptions herein seek to convey the virtual reality renderings and interactions to the degree possible given the limitations of two-dimensional illustrations.

In some embodiments, virtual rendering component 216 can support both external VR views of the industrial area from the perspective of a person outside of the area (as in example presentation 1604), as well as first-person views of the area that simulate the user's presence within the industrial area by rendering a full-scale view of the area (as in example presentation 1602). Users can selectively toggle between these two types of views and provide design input by manually interacting with either of the two views. Virtual rendering component 216 can stream up-to-date VR presentation data 1504 to wearable appliance 1510 to ensure that the view—including the user's angle of perspective—remains current. Virtual rendering component 216 renders industrial assets the VR presentation in accordance with rendering instructions defined by the plant model 1502. Industrial assets that can be rendered as virtual objects within the VR presentation can include, but are not limited to, tanks 1606, conveyors 1608, machines 1610, industrial robots, safety gates, generators, industrial controllers or devices, or other such assets.

The viewing perspective of the VR presentation generated by the virtual rendering component 216 is based on location and orientation data 1508 received by IDE system 202 from the wearable appliances 1510. In this regard, a location and orientation component of wearable appliance 1510 can be configured to determine a current geographical location, orientation, and line of sight of the appliance 1510. In some embodiments, appliance 1510 can leverage global positioning system (GPS) technology to determine the user's absolute location, or may be configured to exchange data with positioning sensors in order to determine the user's relative location. Wearable appliance 1510 can also include orientation sensing components that measure the wearable appliance's current orientation in terms of the direction of the appliance's line of sight, the angle of the appliance 1510 relative to horizontal, etc. Other types of sensors or algorithms can be supported by embodiments of the wearable appliance 1510 for determining a wearer's current location and orientation, including but not limited to inertial measurement units (IMUs) or visual-inertial odometry (VIO). The wearable appliance 1510 can report the location and orientation information to the IDE system 202 as location and orientation data 1508.

Location and orientation data 1508 is used by virtual rendering component 216 to control the point of view of the VR presentation. For example, a user may be viewing a VR presentation of an industrial area (e.g., the first-person presentation depicted in FIG. 16*a* or the external presentation depicted in FIG. 16*b*) via the user's wearable appliance 1510. Virtual rendering component 216 receives location and orientation data 1508 generated by the user's wearable appliance 1510 and renders the presentation in accordance with the user's current location and orientation. In particular, the direction and angle of the viewing perspective of the VR presentation is a function of the user's location and orientation.

In contrast to the first-person view (e.g., presentation 1602 of FIG. 16*a*), the external view generated by IDE system 202 (e.g., presentation 1604 of FIG. 16*b*) renders the industrial area as a virtual down-scaled model of the area, and allows the user to move around and interact with the scaled version of the area. As the user moves around, toward, or away from the virtual scaled industrial area, the wearable appliance 1510 streams updated location and orientation data 1008 to the IDE system 202, which updates the VR presentation data 1504 substantially continuously to simulate the effect of walking around a scale model of the production area.

Returning to FIG. 15, IDE system 202 can generate at least a portion of system project 302—including program code, visualizations, device configurations, device configurations, engineering drawings, bills of materials, etc.—based on VR interaction data 1506 generated by wearable appliance 1510 representing the user's manual interactions with one or both of the first-person VR presentation or the external VR presentation generated by virtual rendering component 216. For example, once the VR presentation of a production area is rendered on wearable appliance 1510, the wearer of appliance 1510 (e.g., a system designer) can manually interact with the rendered VR environment to select and place new industrial devices, machines, equipment, or other industrial assets (e.g., pumps, valves, conduit, safety guarding, etc.) within the virtual environment. To this end, some embodiments of user interface component 204 can render, as overlays within the VR presentation, menus from which various types of industrial assets can be selected (e.g., controllers, motor drives, vats, pumps, valves, industrial robots, conveyor, machining stations, die case furnaces, etc.). The wearer of appliance 1510 can manually interact with these menus using gestures within the VR presentation to select digital representations of desired assets and place the assets at selected locations within the VR environment (e.g., by performing a manual hold and place action). Virtual icons representing the industrial assets can be oriented, moved from one location to another, or removed from the virtual environment using appropriate gestures relative to the virtual assets (e.g., by performing gestures that simulate manually manipulating the virtual assets within the environment). The user's interactions within the VR environment are monitored by the wearable appliance 1510 and sent to the IDE system 202 as VR interaction data 1506.

Within the IDE environment, industrial assets added or moved in this manner can be represented by automation objects 222 corresponding to those assets (e.g., a tank automation object, a valve automation object, etc.). When a user adds a new industrial asset to the VR environment, project generation component 206 can identify the newly added asset and add an appropriate automation object 222 corresponding to the asset to the system project 302. As in other examples described above, the automation object 222 can be selected from the library 502 of standard automation objects maintained by the IDE system 202. Project generation component 206 can also generate sequencing control code for these assets as they are added and linked together within the virtual design environment, where this sequencing code may be based in part on corresponding predefined code modules 508 corresponding to the asset or control code associated with the automation objects 222 themselves.

In other example interactions, the user may act out, in gestures, motions that a new robot or other type of motion device is to perform. For example, the user may perform gestures that manually trace trajectories or motions to be carried out by a robot to facilitate picking and moving a part from a first location to a second location, or may perform gestures indicating a path of motion to be traversed by a motion device during a work cycle. In another example, the user may perform a manual gesture indicating that water is to be pumped from one specified tank to another tank. In response to such actions by the designer—reported as VR interaction data 1506 by the wearable appliance 1510— project generation component 206 will update the system project 302 by generating suitable code, device configurations, drawings, and visualizations that support these design goals and specifications.

Design interaction with the VR environment can be carried out within either the first-person perspective view (e.g., FIG. 16a) or the external view (e.g., FIG. 16b). In general, the first-person view may allow the designer to more easily perform design interactions directed to a specific production line or machine; e.g., by adding conveyors, machines, pumps, values, etc. Interactive inputs directed to larger-scale design aspects may be more easily performed using the external view. Design interactions that may be suitably performed using the external view may include, for example, adding duplicated instances of industrial robots or other industrial assets to respective multiple production areas (e.g., duplicated machines 1612a-1612d in production areas 1614a-1614d, as illustrated in FIG. 16b), moving industrial assets between production areas, or other such design actions. To add or move assets between production areas, the wearer of appliance 1510 can perform manual gestures relative to the external, down-scaled view of the production area to simulate grabbing, moving, and placing assets within the smaller virtual model of the plant facility.

Returning to FIG. 14, in embodiments of the IDE system 202 that support the virtual development environment described above in connection with FIGS. 15-16b, the user interface component 204—via proxy component 214—can share the developer's virtual development environment with the technical support assistant (via a wearable AR/VR appliance worn by the technical expert). Sharing the virtualized design environment in this manner simulates the simultaneous presence of the technical expert and the developer within the virtualized environment, such that each participant sees the other as a human icon (e.g., icon 1616). This allows the remote technical expert to demonstrate, within the virtualized environment, recommended approaches for designing portions of the automation system (e.g., placement or configuration of industrial control devices, placement of machines, etc.).

Similarly, the industrial IDE system 202 may also provide a platform for a user-based community of automation project developers who can interact to share solutions to development problems. In the case of the virtual design environments described above, designers can elect to share their view of their virtual design environment with other users to improve the collaborative design experience. For example, a developer at one location working on a system project 302 may share his or her virtualized view of the installation environment with another user at another location, allowing the other user to view a proposed design and offer supplemental design recommendations. In some embodiments, the IDE system 202 can allow a developer's virtual view to be shared not only with other developers working on the same project 302, but also with users associated with other industrial enterprises who may have experience with the type of system being designed. The IDE system can implement appropriate security features to ensure that users at a first enterprise do not share sensitive proprietary system information with users at other enterprises, while still allowing a managed degree of information sharing to facilitate crowd-sourced development assistance.

Figure 17:
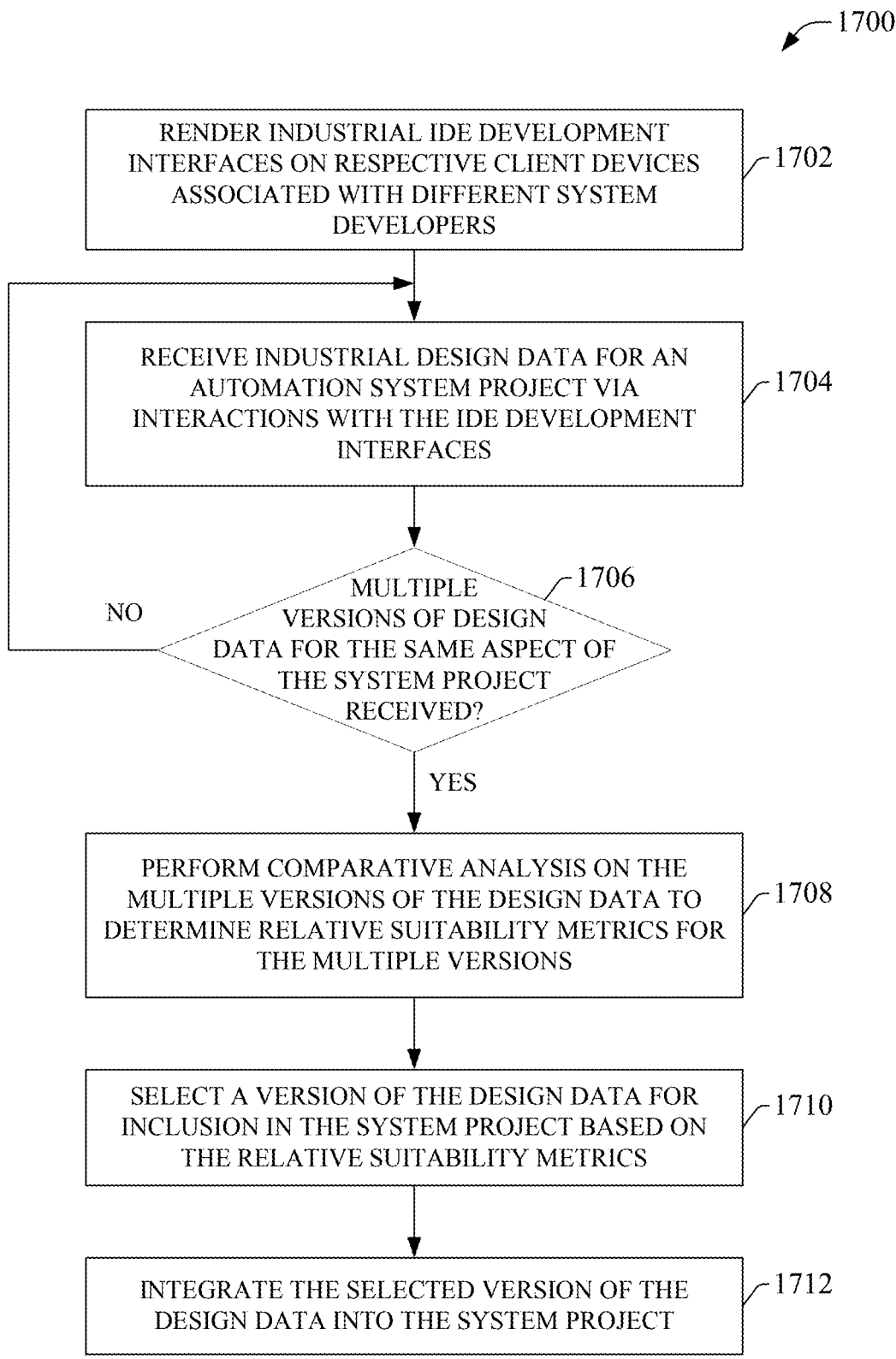
FIG. 17 is a flowchart of an example methodology for managing design contributions from multiple developers of an industrial automation system project.
Figure 18:
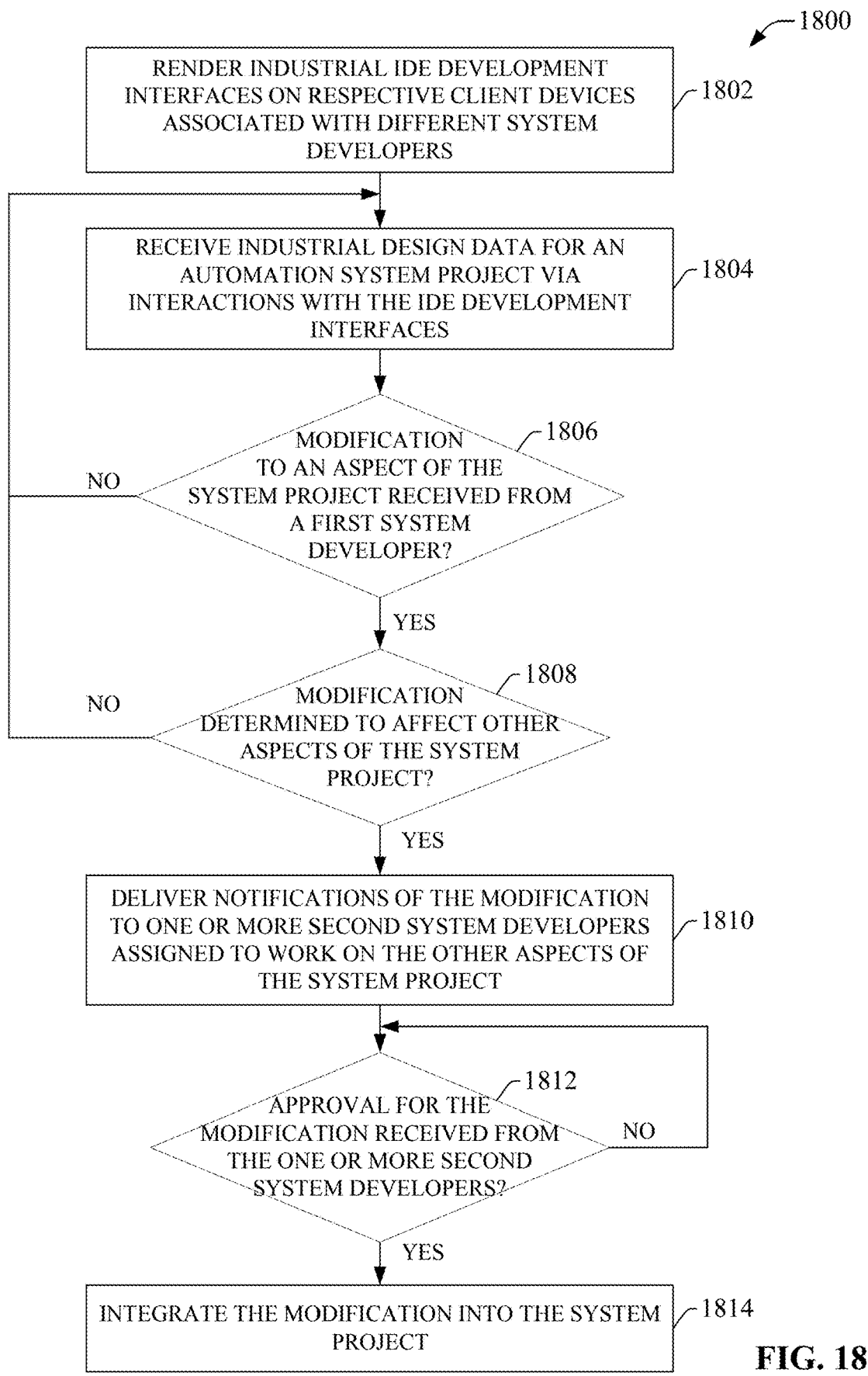
FIG. 18 notifying developers of modifications to an automation system project within a collaborative development environment.

FIGS. 17-18 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 17 illustrates an example methodology 1700 for managing design contributions from multiple developers of an industrial automation system project. Initially at 1702, industrial IDE interfaces are rendered on respective client devices associated with different system developers who are developing an automation system project in a collaborative manner. At 1704, industrial design data is received from an automation system project via interactions with the IDE development interfaces. The industrial design data can be submitted in the form of one or more of industrial controller programming (e.g., ladder logic, sequential function charts, scripted control code such as an industrial DSL, etc.), HMI screen development input, industrial device or equipment selections, engineering drawing input, etc. In some embodiments, the industrial design data can also include completed engineering drawings (e.g., P&ID drawings, electrical drawings, mechanical drawings, etc.), which can be parsed and analyzed by the industrial IDE to identify components of the industrial automation system being designed (e.g., industrial devices, machines, equipment, conduit, piping, etc.) as well as functional and physical relationships between these components.

At 1706, a determination is made as to whether multiple versions of design data for the same aspect of the system project is received. These multiple versions may be, for example, different versions of a portion of industrial control code directed to control of the same industrial asset, different versions of a visualization application for the automation system, different sets of configuration parameter settings for the same industrial device, or other such design data.

If multiple versions of design data for the same aspect are received (YES at step 1706), the methodology proceeds to step 1708, where comparative analysis is performed on the multiple versions of the design data received at step 1704, where the comparative analysis determines relative suitability metrics for the multiple versions. For example, in the case of multiple versions of control programming, this comparative analysis may estimate an estimated machine cycle frequency that will result from execution of each version of the control programming, expected ranges of motion of a mechanical asset that will be implemented by each version of the control programming, a number of individual mechanical motions that will be implemented by the respective versions of the control programming, or other such performance estimates. Other types of relative performance metrics are also within the scope of one or more embodiments.

At 1710, a version of the design data is selected for inclusion into the system project based on the relative suitability metrics obtained at step 1708. For example, in the case of the multiple control programming versions described above, the IDE system may select the version of the control programming expected to carry out its control function in a manner that causes the controlled assets to sustain the least amount of wear while still satisfying a production goal. Other selection criteria are also within the scope of one or more embodiments. At 1712, the selected version of the design data is integrated into the system project.

FIG. 18 illustrates an example methodology 1800 for notifying developers of modifications to an automation system project within a collaborative development environment. Initially, at 1802, industrial IDE development interfaces are rendered on respective client devices associated with respective different developers who are collaboratively developing an automation system project. At 1804, industrial design data for the automation system project is received via interactions with the IDE development interfaces.

AT 1806, a determination is made as to whether a modification to an aspect of the system project is received from a first system developer via one of the IDE development interfaces. If such a modification is received (YES at step 1806), the methodology proceeds to step 1808, where a determination is made as to whether the modification is determined to affect other aspects of the system project. In some embodiments, this determination can be made based on a regression analysis performed on the system project as a whole to determine which other aspects of the system project are likely to be affected by the proposed modification.

If the modification is determined to affect other aspects of the system project (YES at step 1808), the methodology proceeds to step 1810, where notifications of the modification are delivered to one or more second system developers assigned to work on the other aspects of the system project via their respective development interfaces. At 1812, a determination is made as to whether approval for the modification is received from the one or more system developers. In this regard, the IDE system may require collaborative agreement that a modification made to a portion of the system project by one developer will not adversely affect other portions of the system project being designed by other developers. If approval for the modification is received from all of the one or more second developers (YES at step 1812), the modification is integrated into the system project.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors-electronic integrated circuits that perform logic operations employing electric signals-configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 19:
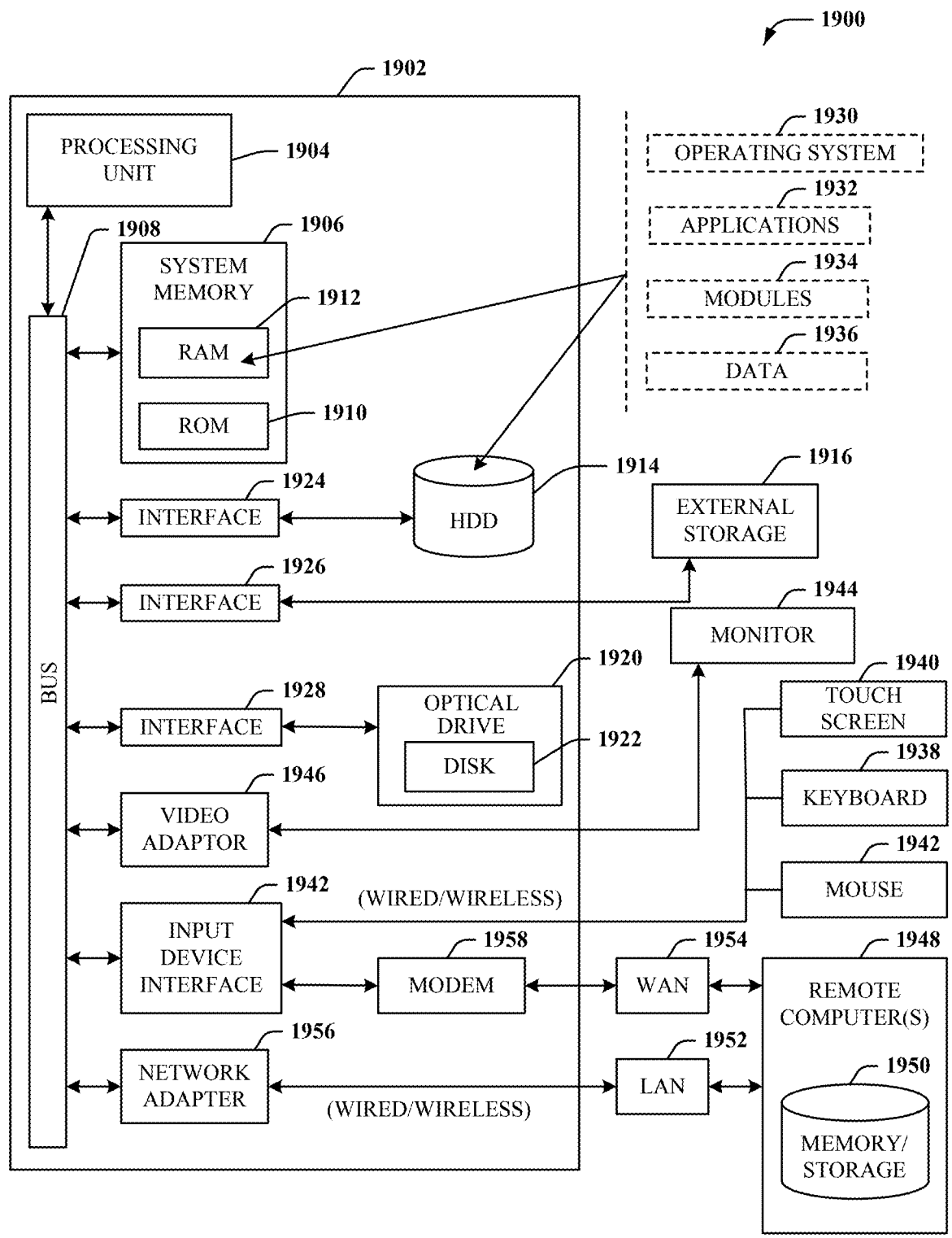
FIG. 19 is an example computing environment.
Figure 20:
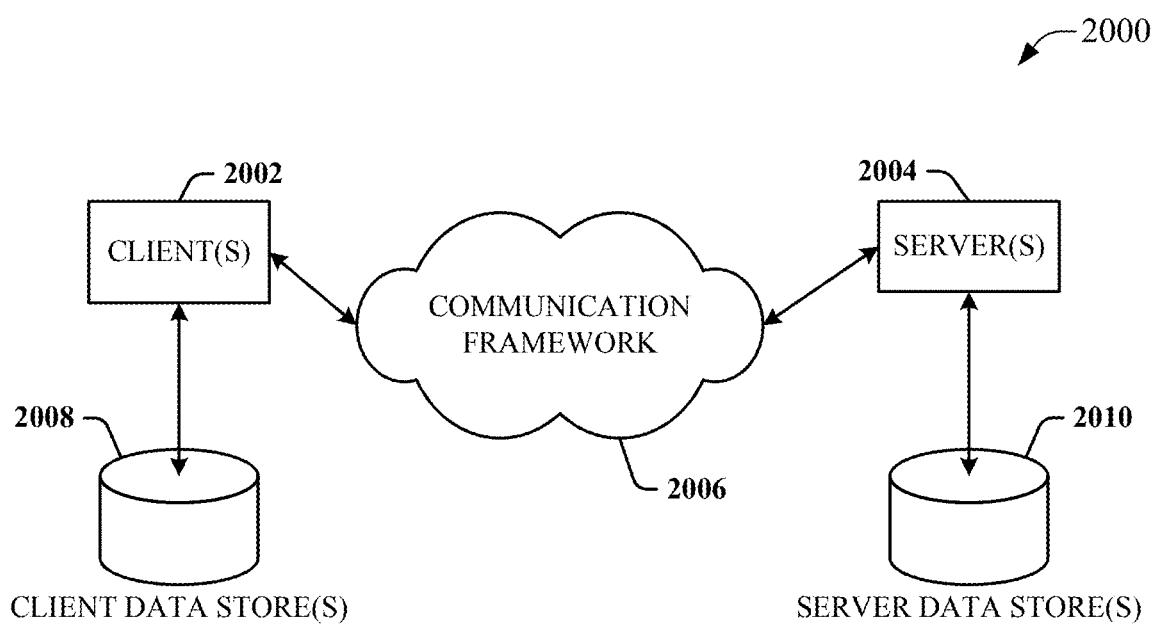
FIG. 20 is an example networking environment.

In order to provide a context for the various aspects of the disclosed subject matter, FIGS. 19 and 20 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19 the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and an optical disk drive 1920 (e.g., which can read or write from a CD-ROM disc, a DVD, a BD, etc.). While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914. The HDD 1914, external storage device(s) 1916 and optical disk drive 1920 can be connected to the system bus 1908 by an HDD interface 1924, an external storage interface 1926 and an optical drive interface 1928, respectively. The interface 1924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for application programs 1932. Runtime environments are consistent execution environments that allow application programs 1932 to run on any operating system that includes the runtime environment. Similarly, operating system 1930 can support containers, and application programs 1932 can be in the form of containers, which are lightweight, standalone, executable packages of software that include, e.g., code, runtime, system tools, system libraries and settings for an application.

Further, computer 1902 can be enable with a security module, such as a trusted processing module (TPM). For instance with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1944 or other type of display device can be also connected to the system bus 1908 via an interface, such as a video adapter 1946. In addition to the monitor 1944, a computer typically includes other peripheral output devices (not shown), such as speakers, printers, etc.

The computer 1902 can operate in a networked environment using logical connections via wired and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1952 through a wired and/or wireless communication network interface or adapter 1956. The adapter 1956 can facilitate wired or wireless communication to the LAN 1952, which can also include a wireless access point (AP) disposed thereon for communicating with the adapter 1956 in a wireless mode.

When used in a WAN networking environment, the computer 1902 can include a modem 1958 or can be connected to a communications server on the WAN 1954 via other means for establishing communications over the WAN 1954, such as by way of the Internet. The modem 1958, which can be internal or external and a wired or wireless device, can be connected to the system bus 1908 via the input device interface 1942. In a networked environment, program modules depicted relative to the computer 1902 or portions thereof, can be stored in the remote memory/storage device 1950. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above. Generally, a connection between the computer 1902 and a cloud storage system can be established over a LAN 1952 or WAN 1954 e.g., by the adapter 1956 or modem 1958, respectively. Upon connecting the computer 1902 to an associated cloud storage system, the external storage interface 1926 can, with the aid of the adapter 1956 and/or modem 1958, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 20 is a schematic block diagram of a sample computing environment 2000 with which the disclosed subject matter can interact. The sample computing environment 2000 includes one or more client(s) 2002. The client(s) 2002 can be hardware and/or software (e.g., threads, processes, computing devices). The sample computing environment 2000 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and servers 2004 can be in the form of a data packet adapted to be transmitted between two or more computer processes. The sample computing environment 2000 includes a communication framework 2006 that can be employed to facilitate communications between the client(s) 2002 and the server(s) 2004. The client(s) 2002 are operably connected to one or more client data store(s) 2008 that can be employed to store information local to the client(s) 2002. Similarly, the server(s) 2004 are operably connected to one or more server data store(s) 2010 that can be employed to store information local to the servers 2004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
a user interface component configured to render integrated development environment (IDE) interfaces on respective client devices and to receive, via interaction with the IDE interfaces, industrial design input that defines aspects of an industrial automation control project, wherein the industrial design input comprises alternate versions of industrial control code, received from respective different IDE interfaces of the IDE interfaces, designed to perform a same control function of the industrial automation control project;
a collaboration management component configured to select one of the alternate versions of the industrial control code based on a comparison of the alternate versions relative to one or more defined selection criteria, and to integrate the one of the alternate versions of the industrial control code into the industrial automation control project, wherein the one or more defined selection criteria comprise at least a determination of which of the alternate versions of the industrial control code is estimated to perform the control function using a fewest number of mechanical movements; and
a project generation component configured to generate system project data based on the industrial design input.

2. The system of claim 1, wherein the one or more defined selection criteria further comprise at least one of a determination of which of the alternate versions of the industrial control code is estimated to subject a controlled industrial asset to a least amount of mechanical wear, a determination of which of the alternate versions of the industrial control code is estimated to perform the control function using a least amount of code, or a determination of which of the alternate versions of the industrial control code is estimated to perform the control function using shortest mechanical motions.

3. The system of claim 1, wherein the industrial control code comprises at least one of ladder logic, sequential function charts, function block diagrams, or structured text.

4. The system of claim 1, wherein the collaboration management component is configured to select the one of the alternate versions of the industrial control code based on results of respective simulations performed on the alternate versions of the industrial control code.

5. The system of claim 1, wherein
the collaboration component is further configured to, in response to receipt of industrial design input from a first client device associated with a first user defining a modification to a first aspect of the industrial automation control project, determine whether the modification will affect one or more second aspects of the industrial automation control project, and
the user interface component is further configured to, in response to a determination by the collaboration component that the modification will affect the one or more second aspects, deliver notifications to one or more second client devices associated with users assigned to develop the one or more second aspects of the industrial automation control project.

6. The system of claim 5, wherein the collaboration component is configured to perform a regression analysis on the industrial automation control project to determine interdependencies between aspects of the industrial automation control project, and to determine whether the modification will affect the one or more second aspects based on the interdependencies learned by the regression analysis.

7. The system of claim 1, wherein the user interface component is configured to customize the IDE interfaces on the respective client devices in accordance with defined roles of users associated with the respective client devices.

8. The system of claim 7, wherein the defined roles include at least a lead developer role, the user interface component is configured to render, on a client device associated with the developer role, an IDE interface that at least one of permits design override privileges or tracks design contributions submitted by developers associated with other roles.

9. The system of claim 1, wherein the system project data comprises at least control programming that, in response to execution on one or more industrial devices, facilitates monitoring and control of an industrial automation system.

10. The system of claim 1, wherein
at least one of the client devices is a wearable virtual reality (VR) appliance,
the executable components further comprise a virtual rendering component configured to render an interactive three-dimensional virtual reality (VR) representation of an industrial facility on the VR appliance, the user interface component is configured to receive VR interaction data representing manual interactions of a wearer of the VR appliance with the VR representation of the industrial facility, the manual interactions indicative of design input that defines aspects of the industrial automation system, and the project generation component is configured to translate the VR interaction data into a portion of the system project data satisfying the design input.

11. The system of claim 1, wherein the collaboration component is further configured to at least one of merge two overlapping sets of the industrial design input received from respective two client devices into the industrial automation control project, identify and delete redundant portions of the industrial automation control project, or render a recommendation via one or more of the IDE interfaces for resolving a conflict between two or more sets of the industrial automation control project.

12. A method, comprising:
rendering, by a system comprising a processor, integrated development environment (IDE) interfaces on respective client devices;
receiving, by the system via interaction with the IDE interfaces, industrial design input that defines aspects of an industrial control and monitoring project, wherein the industrial design input comprises alternate versions of industrial control programming, received from respective different IDE interfaces of the IDE interfaces, designed to perform a same control function of the industrial control and monitoring project;
selecting, by the system, one of the alternate versions of the industrial control programming based on a determination of which of the alternate versions best satisfy one or more defined selection criteria comprising at least a determination of which of the alternate versions of the industrial control programming is estimated to perform the control function using a fewest number of mechanical movements;
integrating, by the system, the one of the alternate versions of the industrial control programming into the industrial control and monitoring project; and
generating, by the system, system project data based on the industrial design input.

13. The method of claim 12, wherein the one or more defined selection criteria further comprises at least one of a determination of which of the alternate versions of the industrial control programming is estimated to subject a controlled industrial asset to a least amount of mechanical wear, a determination of which of the alternate versions of the industrial control programming is estimated to perform the control function using a least amount of code, or a determination of which of the alternate versions of the industrial control programming is estimated to perform the control function using shortest mechanical motions.

14. The method of claim 12, wherein the industrial control programming comprises at least one of ladder logic, sequential function charts, function block diagrams, or structured text.

15. The method of claim 12, wherein the selecting comprises selecting the one of the alternate versions of the industrial control programming further based on results of respective simulations performed on the alternate versions of the industrial control programming.

16. The method of claim 12, further comprising:
in response to receipt of industrial design input from a first client device associated with a first user defining a modification to a first aspect of the industrial control and monitoring project, determining, by the system, one or more second aspects of the industrial control and monitoring project affected by the modification, and
rendering, by the system, notifications of the modifications on one or more second client devices associated with users assigned to develop the one or more second aspects of the industrial control and monitoring project.

17. The method of claim 16, further comprising performing, by the system, a regression analysis on the system project data to determine interdependencies between aspects of the industrial control and monitoring project,
wherein the determining of the one or more second aspects of the industrial control and monitoring project affected by the modification comprises determining the one or more second aspects based on the interdependencies learned by the regression analysis.

18. The method of claim 12, wherein the rendering comprises customizing the IDE interfaces on the respective client devices in accordance with defined roles of users associated with the respective client devices.

19. A non-transitory computer-readable medium having stored thereon instructions that, in response to execution, cause a system comprising a processor to perform operations, the operations comprising:
rendering integrated development environment (IDE) interfaces on respective client devices;
receiving, via interaction with the IDE interfaces, industrial design input that defines aspects of an industrial automation project, wherein the industrial design input comprises alternate versions of industrial control code, received from respective different IDE interfaces of the IDE interfaces, designed to perform a same control function of the industrial automation project;
selecting one of the alternate versions of the industrial control code based on application of one or more defined selection criteria to the alternate versions, wherein the one or more defined selection criteria comprise at least a determination of which of the alternate versions of the industrial control code is estimated to perform the control function using a fewest number of mechanical movements;
integrating the one of the alternate versions of the industrial control code into the industrial automation project; and
generating system project data based on the industrial design input.

20. The non-transitory computer-readable medium of claim 19, wherein the one or more defined selection criteria further comprise at least one of a determination of which of the alternate versions of the industrial control code is estimated to subject a controlled industrial asset to a least amount of mechanical wear, a determination of which of the alternate versions of the industrial control code is estimated to perform the control function using a least amount of code, or a determination of which of the alternate versions of the industrial control code is estimated to perform the control function using shortest mechanical motions.

* * * * *